(12) United States Patent
Larouche et al.

(10) Patent No.: US 12,280,493 B2
(45) Date of Patent: Apr. 22, 2025

(54) END EFFECTOR FOR ROBOTIC POSITIONER

(71) Applicant: CTRL ROBOT INC., Saint-Isidore (CA)

(72) Inventors: Martin Larouche, Saint-Isidore (CA); Hubert Thibault, Lévis (CA)

(73) Assignee: CTRL ROBOT INC., Saint-Isidore (CA)

(*) Notice: Subject to any disclaimer, the term of this patent is extended or adjusted under 35 U.S.C. 154(b) by 777 days.

(21) Appl. No.: 17/455,615

(22) Filed: Nov. 18, 2021

(65) Prior Publication Data

US 2022/0161445 A1    May 26, 2022

Related U.S. Application Data

(60) Provisional application No. 63/116,269, filed on Nov. 20, 2020.

(51) Int. Cl.
  *B25J 15/00* (2006.01)
  *B25J 15/06* (2006.01)

(52) U.S. Cl.
  CPC ....... *B25J 15/0683* (2013.01); *B25J 15/0028* (2013.01)

(58) Field of Classification Search
  CPC ............. B25J 15/0683; B25J 15/0028; B25J 15/0691; B25J 15/0616
  USPC ...................................... 294/103.1, 183, 189
  See application file for complete search history.

(56) References Cited

U.S. PATENT DOCUMENTS

| | | | |
|---|---|---|---|
| 5,711,565 A * | 1/1998 | Smith | B65F 3/041 294/902 |
| 6,666,489 B2 * | 12/2003 | Kruger | B25B 5/087 294/197 |
| 6,979,032 B2 * | 12/2005 | Damhuis | B65G 47/917 294/185 |
| 8,267,448 B2 * | 9/2012 | Dagenais | E21B 19/163 294/102.2 |
| 8,919,844 B1 * | 12/2014 | Mascorro | B25J 15/0226 294/203 |
| 9,694,500 B1 * | 7/2017 | Ferrier | B25J 15/02 |
| 10,011,019 B1 * | 7/2018 | Strauss | B25J 15/022 |

* cited by examiner

*Primary Examiner* — Paul T Chin
(74) *Attorney, Agent, or Firm* — Norton Rose Fulbright Canada LLP

(57) ABSTRACT

There is disclosed an end effector for a robotic positioner. The end effector has a frame adapted to connect to the robotic positioner, the frame defining a guide. A first gripper member is connected the frame and a second gripper member defines a follower operatively engaged to the guide, an engagement between the follower and the guide constraining the second gripper member to movement in at least one rotational movement about a virtual pivot spaced away from the first gripper member, the second gripper member, the follower and the guide. At least one actuator is connected to the second gripper member for moving the second gripper member toward and away from the first gripper member in the rotational movement.

20 Claims, 14 Drawing Sheets

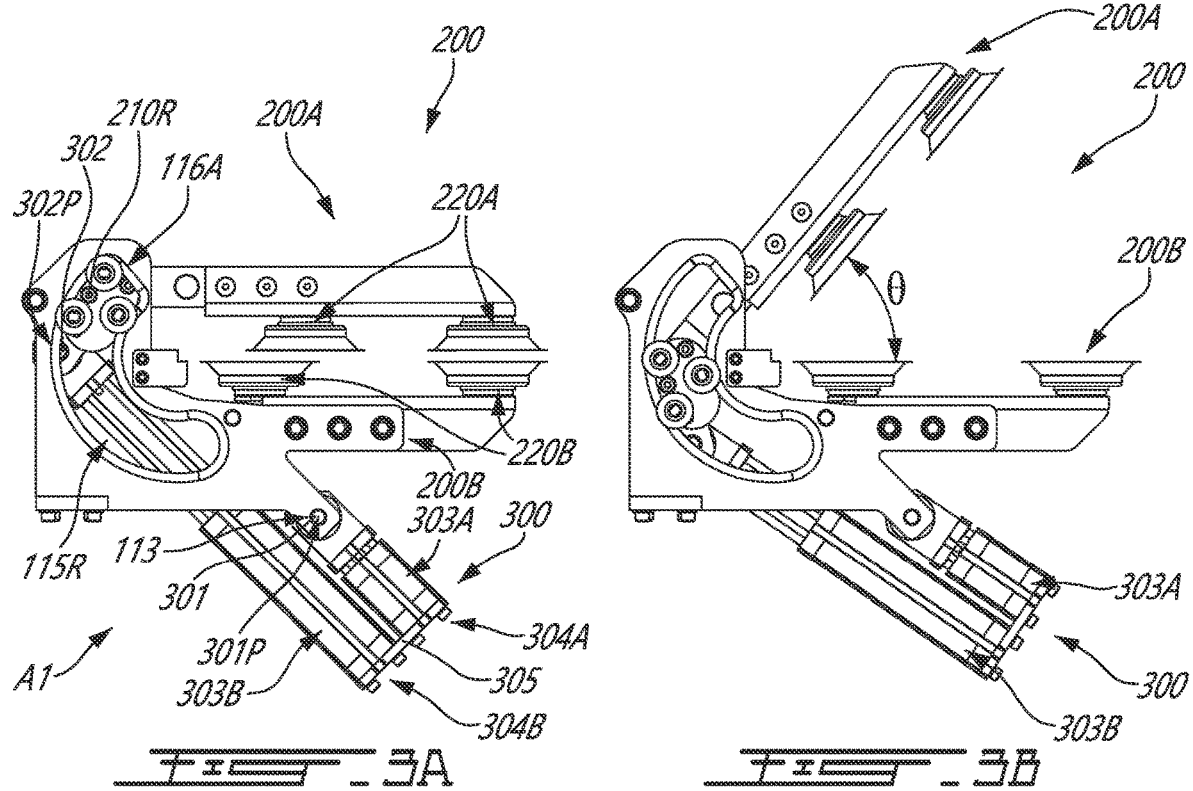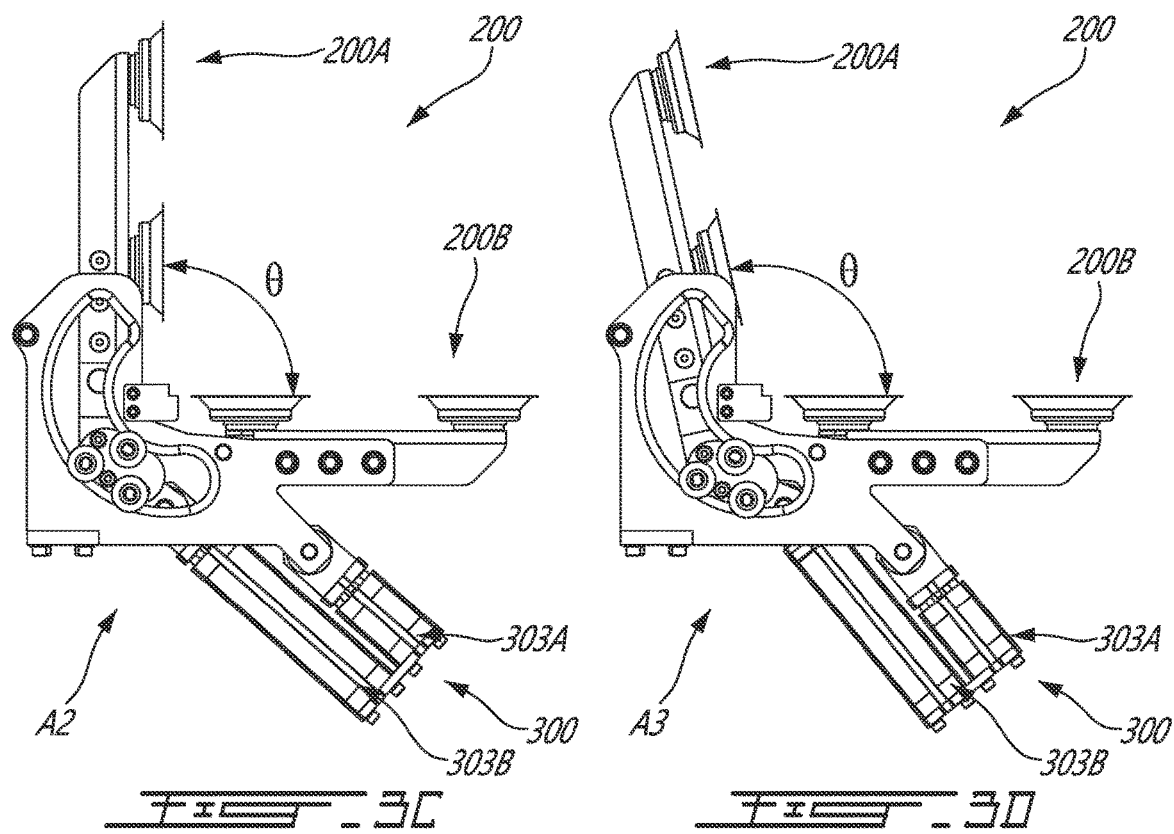

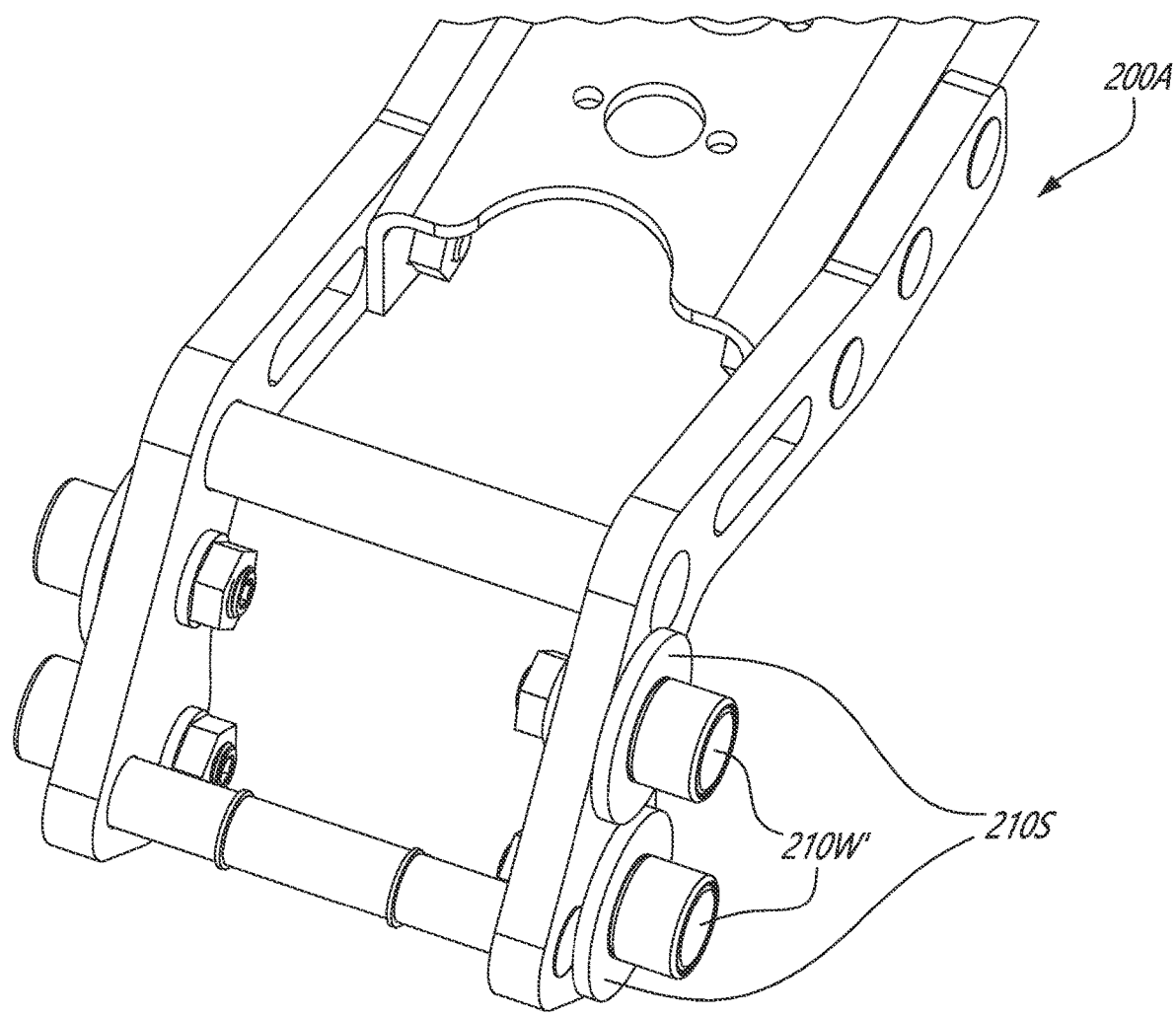

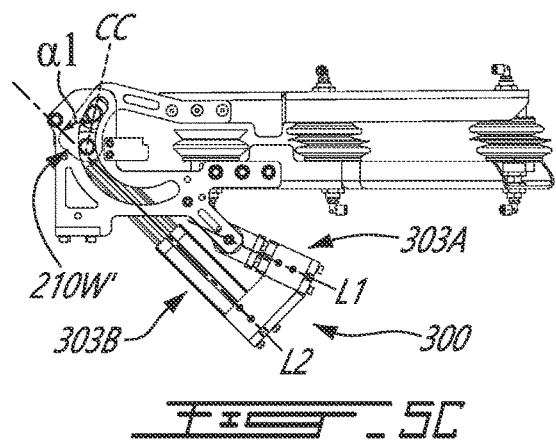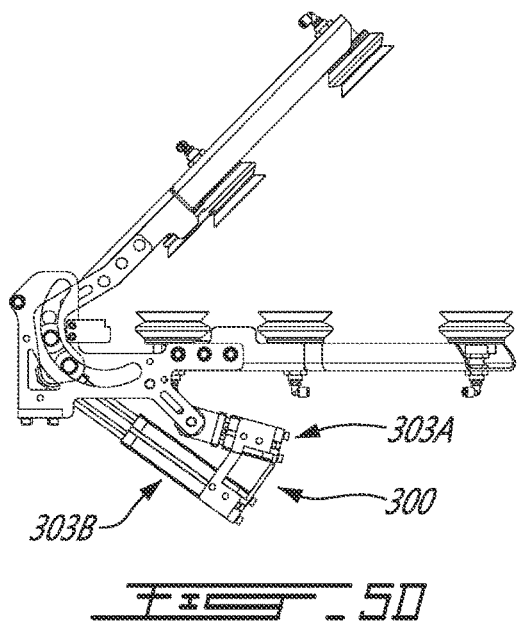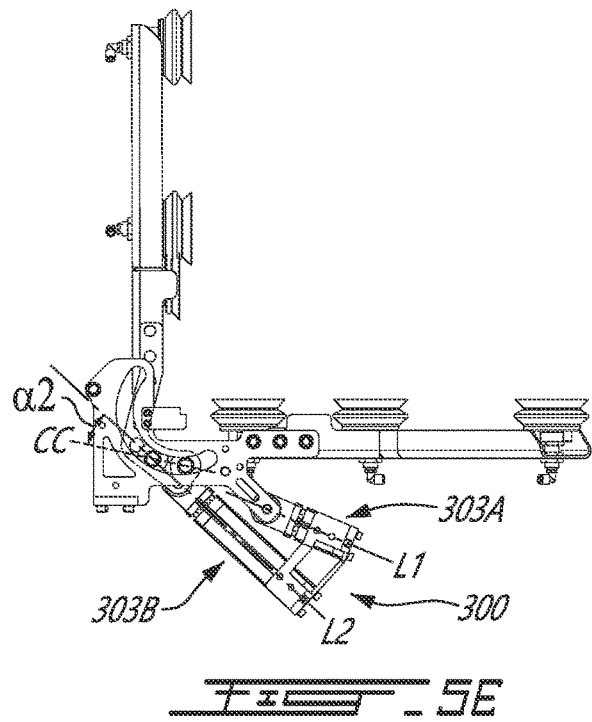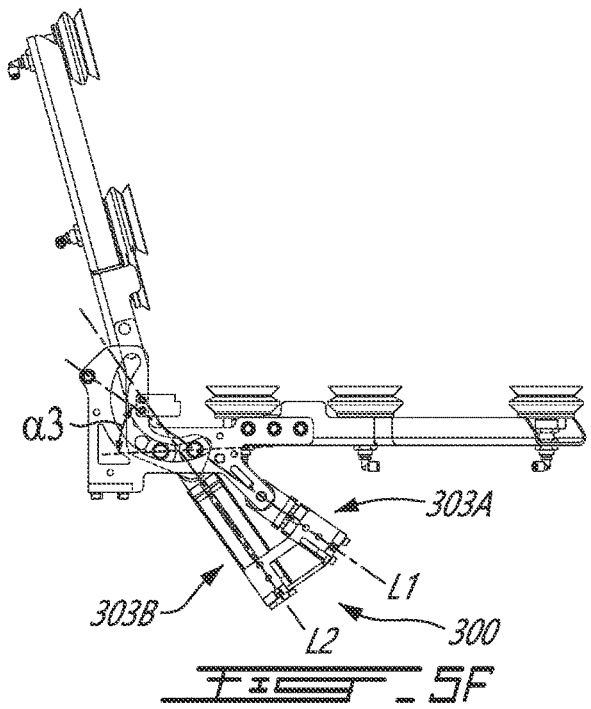

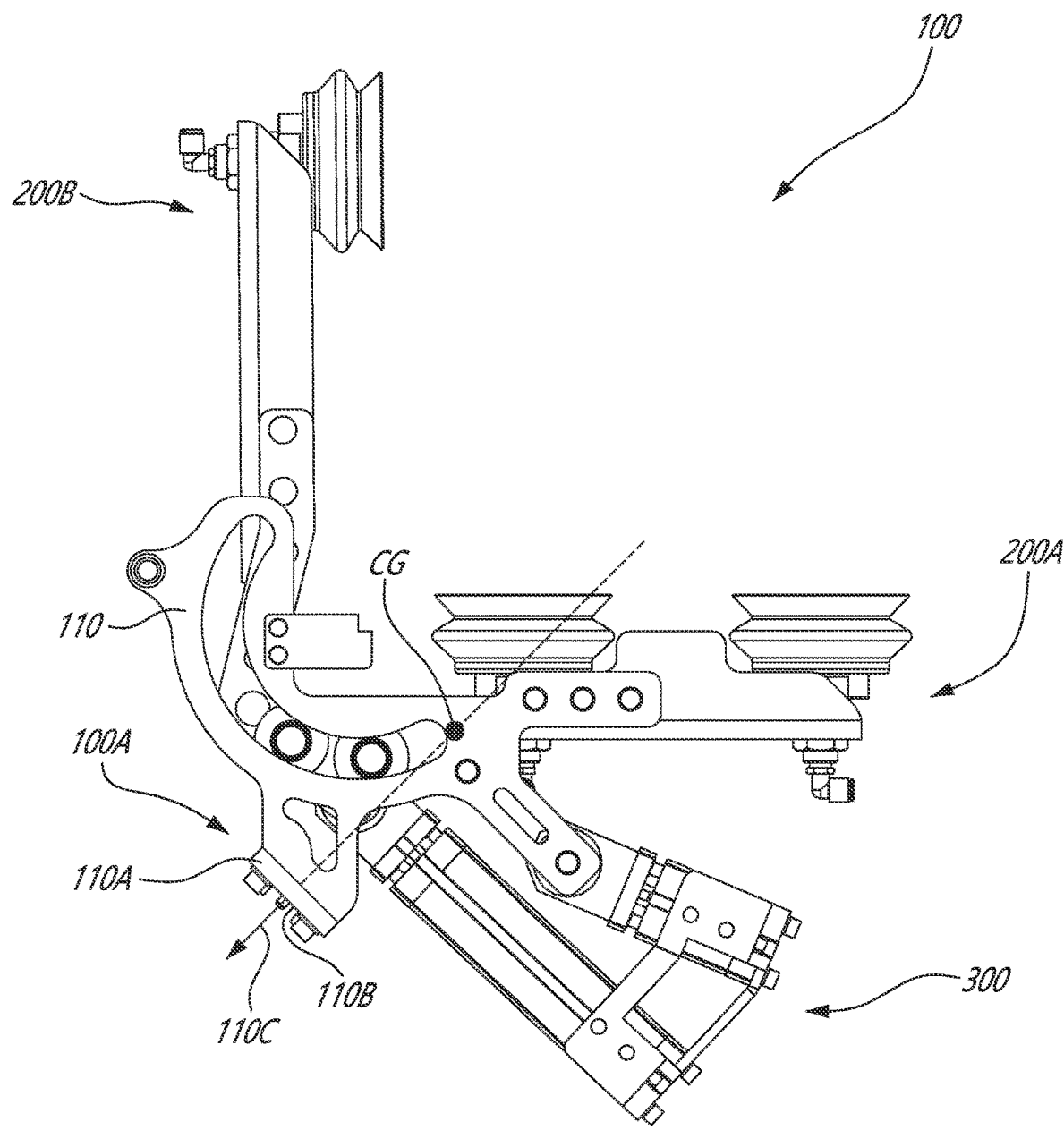

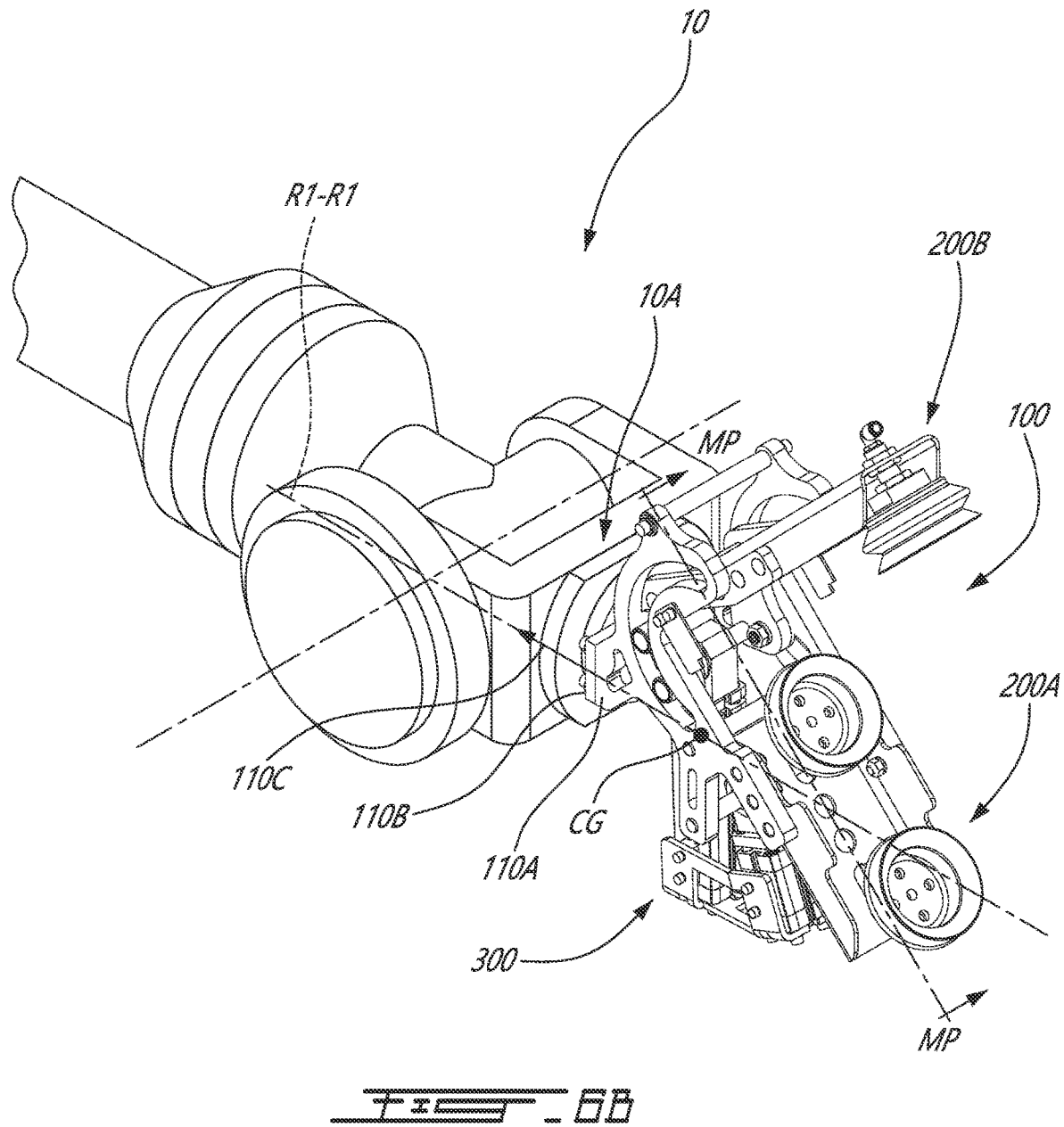

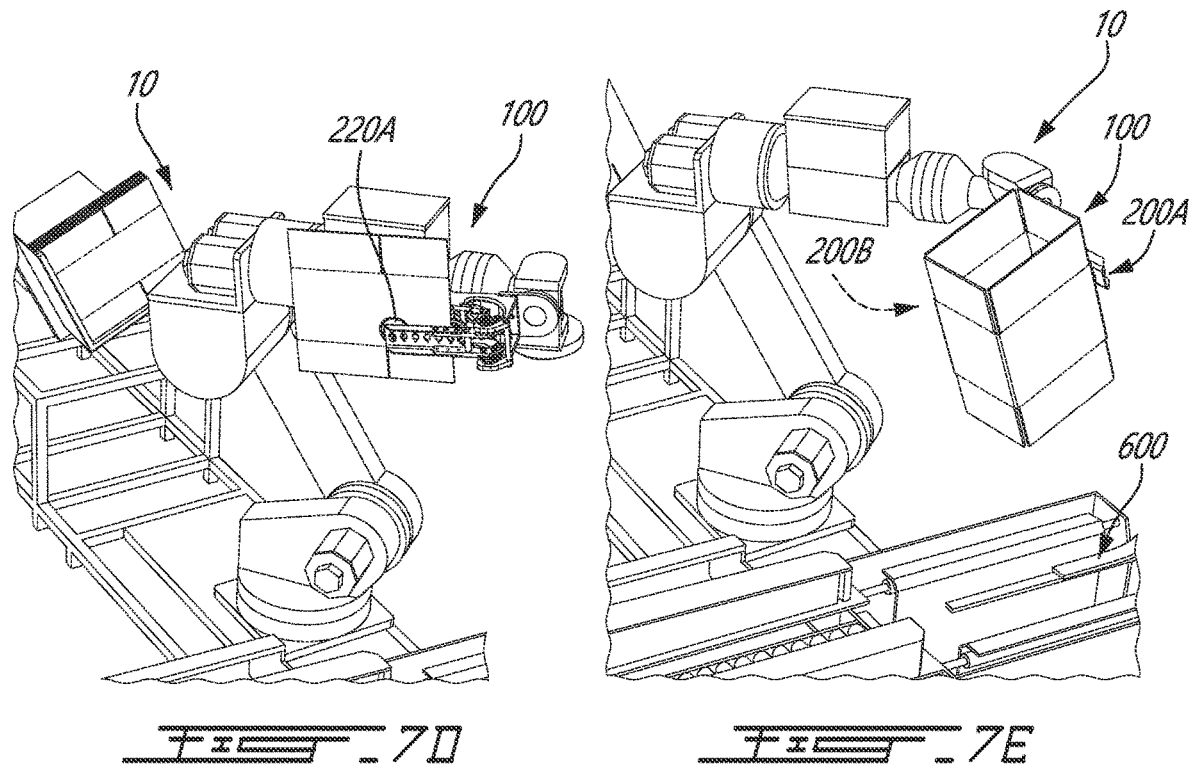
FIG. 7D
FIG. 7E
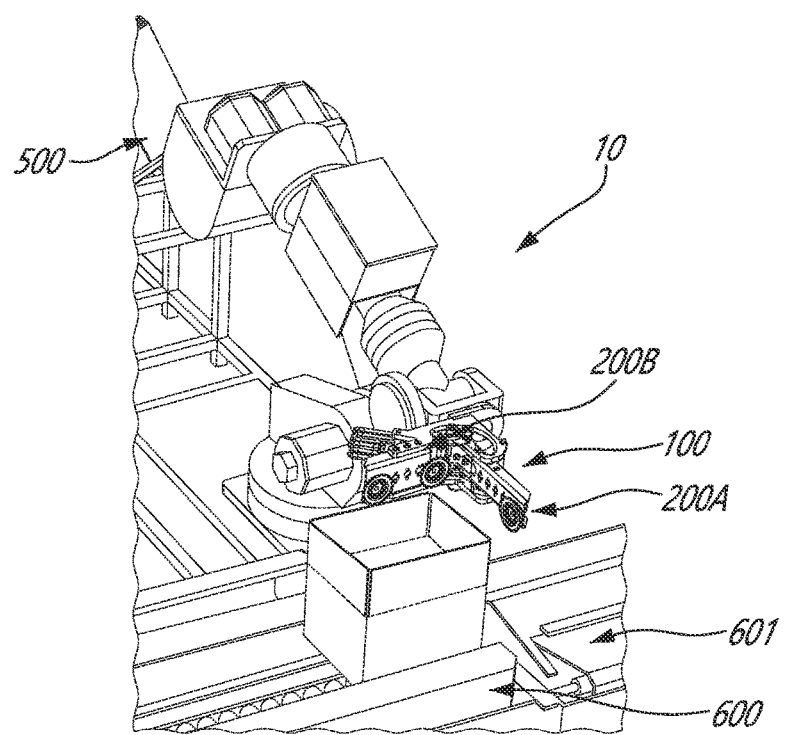
FIG. 7F

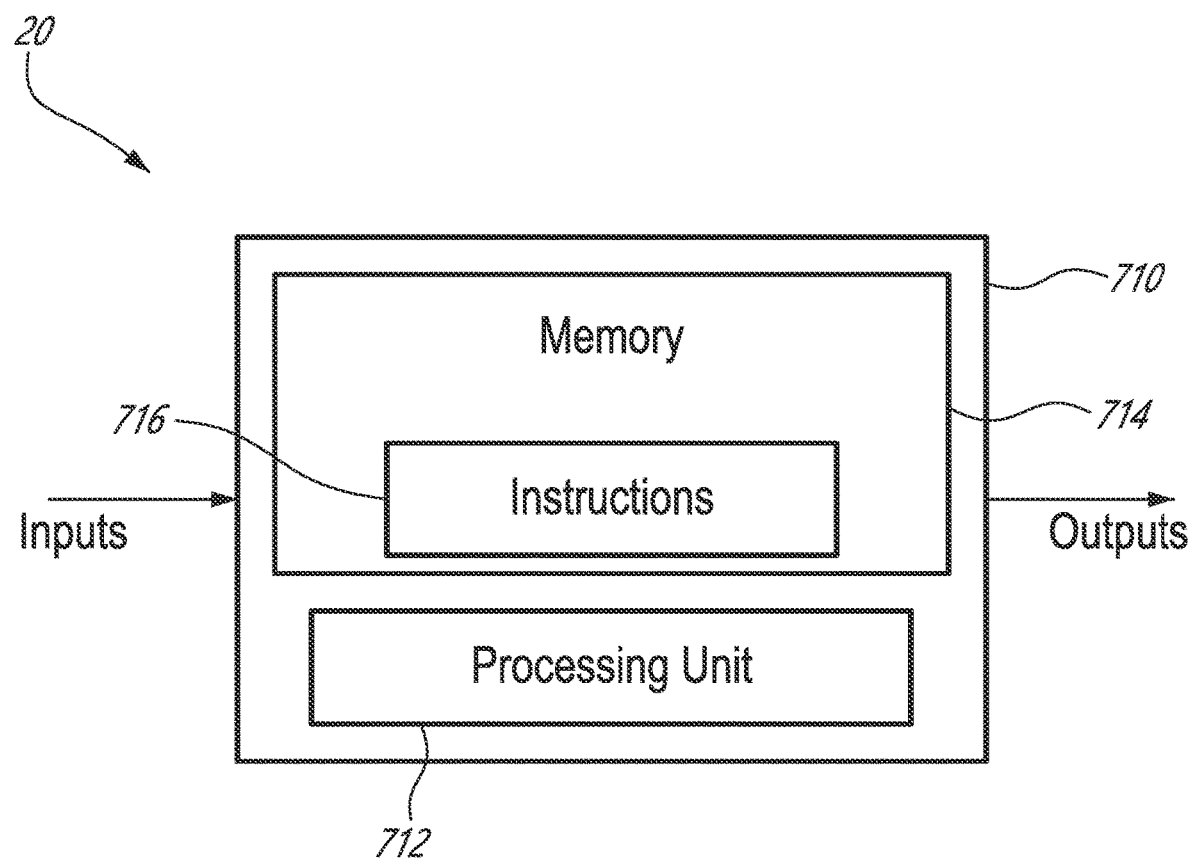

END EFFECTOR FOR ROBOTIC POSITIONER

CROSS-REFERENCE TO RELATED APPLICATION

The present application claims the priority of U.S. Patent Application Ser. No. 63/116,269, filed on Nov. 20, 2020, the entire content of which is incorporated herein by reference.

TECHNICAL FIELD

The application relates generally to robotic positioners and, more particularly, to end effectors for such robotic positioners.

BACKGROUND OF THE ART

Robotic positioner or robotic arm may achieve various tasks. Complexity of such tasks may vary depending on the industry. Tools such as end effectors may be mounted on such robotic positioners to manipulate objects and form them into shape. For instance, in the manufacturing and/or packaging industries, robotic positioner may be used to perform repetitive tasks, such as those performed for folding or unfolding sheets of material or panels, as may be applicable while forming/erecting boxes on a packaging line. Robotic positioner may have a limited payload. End effectors may be cumbersome, heavy and/or may have limited control over the folding/unfolding of panels during the various manipulations performed.

SUMMARY

In a first aspect, there is provided an end effector for forming a multi-panel box having panels hingedly connected one to another, the end effector comprising: a frame defining a guide; a first gripper member connected the frame, the first gripper member adapted to connect to a first one of the panels of the multi-panel box; a second gripper member adapted to connect to a second one of the panels of the multi-panel box hingedly connected to the first one of the panels at an edge of the multi-panel box, the second gripper member defining a follower operatively engaged to the guide, an engagement between the follower and the guide constraining the second gripper member to movement in at least one rotational movement about a virtual pivot spaced away from the first gripper member, the second gripper member, the follower and the guide; and at least one actuator connected to the second gripper member for moving the second gripper member toward and away from the first gripper member in the at least one rotational movement, the at least one actuator is operable to move the second gripper member relative to the first gripper member between a closed position and at least a first open position, a gripping zone defined between the first and second gripper members, the gripping zone having a variable volume in that movement of the second gripper member towards the first gripper member from the first open position to the closed position closes up the gripping zone between the first and second gripper members.

In a second aspect, there is provided an end effector for a robotic positioner, the end effector comprising: a frame adapted to connect to the robotic positioner; a first gripper member extending from the frame; a second gripper member angularly displaceable relative to the first gripper member about a virtual pivot, along an arcuate path; and an actuator arrangement operable to move the second gripper member relative to the first gripper member, the actuator arrangement moving about the virtual pivot as the second gripper member moves relative to the first gripper member.

In a third aspect, there is provided an end effector for a robotic positioner, the end effector comprising: a frame adapted to connect to the robotic positioner; a first gripper member extending from the frame; a second gripper member angularly displaceable relative to the first gripper member about a virtual pivot, along an arcuate path; and an actuator arrangement operable to move the second gripper member relative to the first gripper member, the actuator arrangement connected to the frame via a fixed pivot and to the second gripper member defining a floating pivot relative to the virtual pivot.

In a fourth aspect, there is provided an end effector for a robotic positioner, the end effector comprising: a frame adapted to connect to the robotic positioner, the frame defining a guide; a first gripper member connected the frame; a second gripper member defining a follower operatively engaged to the guide, an engagement between the follower and the guide constraining the second gripper member to movement in at least one rotational movement about a virtual pivot spaced away from the first gripper member, the second gripper member, the follower and the guide; and at least one actuator connected to the second gripper member for moving the second gripper member toward and away from the first gripper member in the rotational movement.

In a fifth aspect, there is provided a robotic positioner including the end effector according to the above aspects.

DESCRIPTION OF THE DRAWINGS

Reference is now made to the accompanying figures in which:

FIG. 3A is a side plane view of the end effector of FIGS. 1-2, in a closed position, according to an embodiment;

FIG. 3B is a side plane view of the end effector of FIGS. 1-2, in an open position, according to an embodiment;

FIG. 3C is a side plane view of the end effector of FIGS. 1-2, in another open position, according to an embodiment;

FIG. 3D is a side plane view of the end effector of FIGS. 1-2, in yet another open position, according to an embodiment;

FIG. 5B is a magnified view of gripper carriers of the end effector of FIG. 5A;

FIGS. 5C-5F are side plane views of the end effector of FIG. 5A, shown in respective positions;

FIG. 6A is a side plane view of an end effector such as shown in FIGS. 5A-5F, according to another embodiment;

FIG. 6B is a perspective view of an arm end of a robotic positioner as shown in FIG. 1, illustrating a position and an orientation of the end effector of FIG. 6A relative to the arm end of the robotic positioner;

FIGS. 7A-7F show an exemplary sequence of operations performed by the robotic positioner partially shown in FIG. 1 and having the end effector of FIGS. 1-2, according to an embodiment; and FIG. 8 is a schematic illustration of an exemplary control unit for operating the robotic positioner and end effector, according to an embodiment.

DETAILED DESCRIPTION

Figure 1:
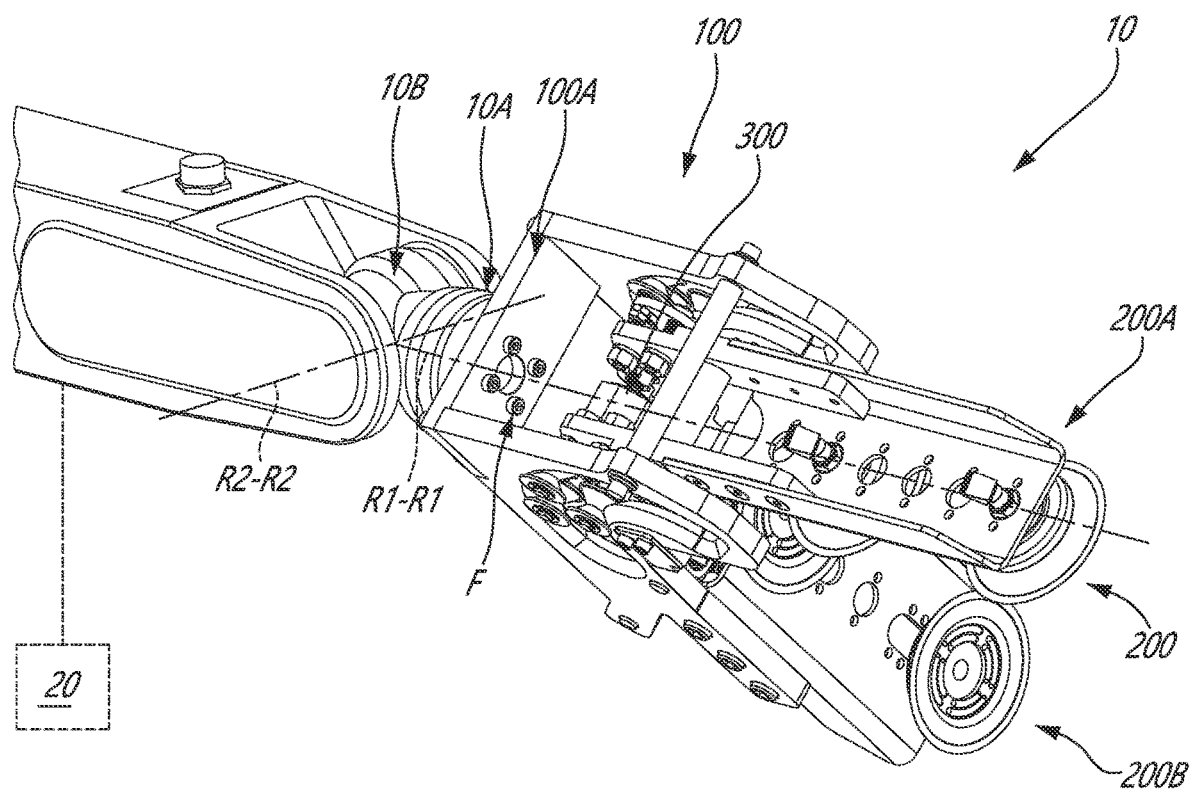
FIG. 1 is a perspective view of an arm end of a robotic positioner with an end effector, according to an embodiment.

FIG. 1 illustrates a connector end 10A of a robotic positioner 10 with an end effector 100 coupled thereto. The robotic positioner 10 may be a robotic arm, and the end effector 100 may be adapted to various types of robotic arms. For instance, as one possibility, the robotic positioner 10 may be a FANUC® robotic arm commercialized by FANUC® Robotics America Corporation.

The robotic positioner 10 may perform predetermined repetitive actions, which may have been taught manually by an operator, such as by moving the robotic arm segments of the robotic positioner 10 sequentially to record (or "memorize") and achieve a desired movement of the end effector 100 within a given space. As another example, machine learning may also be involved to tune or otherwise perform movements based on working parameters and/or operating conditions.

A control unit 20 may control the operations of the robotic positioner 10 and/or the end effector 100. For instance, the robotic positioner 10 may receive signal outputs, such as electrical signals or fluid (compressible or incompressible fluids, such as air, oil, etc.) signals, from such control unit 20 to supply instructions or power to one or more motors, actuators, valves, etc. of the robotic positioner 10. Signal outputs may be based on sensor inputs monitored and/or analyzed by the control unit 20. The robotic position 10 may pivot and/or translate the end effector 100 to change its spatial orientation and/or position. Motions of the connector end 10A (and other robotic arm segments) of the robotic positioner 10 in a plurality of degree of freedom (axial and/or angular) cause movements of the end effector 100 along a predetermined three-dimensional path/trajectory.

In at least some embodiments, such as shown, the connector end 10A includes a two-rotational degrees pivot 10B defining a degree of rotational freedom about rotational axes R1-R1 and R2-R2. As shown, the rotational axes extend orthogonally relative to each other to allow two degrees of rotational freedom at the connector end 10A. Such connected end 10A is only one possibility of connector end capabilities. In the depicted embodiment, the end effector 100 defines a meridional plane MP extending along the rotation axis R1-R1. As shown, the meridional plane MP coincides with the rotation axis R1-R1. The meridional plane MP may be offset from the rotational axis R1-R1 and/or angled relative the rotational axis R1-R1, in other embodiments.

The end effector 100 is connected to the connector end 10A via an attachment portion 100A. The attachment portion 100A provides means for attaching the end effector 100 with the connector 10A. In the depicted embodiment, the attachment portion 100A is fastened to the connector end 10A via fasteners F. Other suitable attachment portion 100A may be contemplated in other embodiments. For instance, the end effector 100 may connect to the connector end 10A by complementary threads, bayonet connection (or other interlocking connection types), and/or clamping, with a universal or custom connector end 10A of a robotic arm. In the depicted embodiment, the attachment portion 100A is removably attachable to the connector end 10A. Some robotic arm may have the end effector 100 permanently attached thereto (instead of retrofitted types of end effector 100).

The end effector 100, so as the robotic positioner 10, is operable to perform various tasks, which may require speed and precision. In a practical implementation, the end effector 100 may manipulate, form and/or transport objects, such as boxes (e.g. cartons, cardboards, carton box, etc.). Such tasks may be part of a sequence of operations in a manufacturing and/or packaging line, for instance.

The end effector 100 includes a gripper assembly 200. The gripper assembly 200 has a first gripper member 200A and at least a second gripper member 200B. The first gripper member 200A is angularly displaceable relative to the second gripper member 200A via an actuator arrangement 300. As will be described in further detail below, in a practical application of the end effector 100, the gripper assembly 200 is operable to take and lift a multi-panel box in a folded state from a storage area and shape the box by imparting a movement to side panels of the box from the folded state, to an unfolded state.

Figure 2:
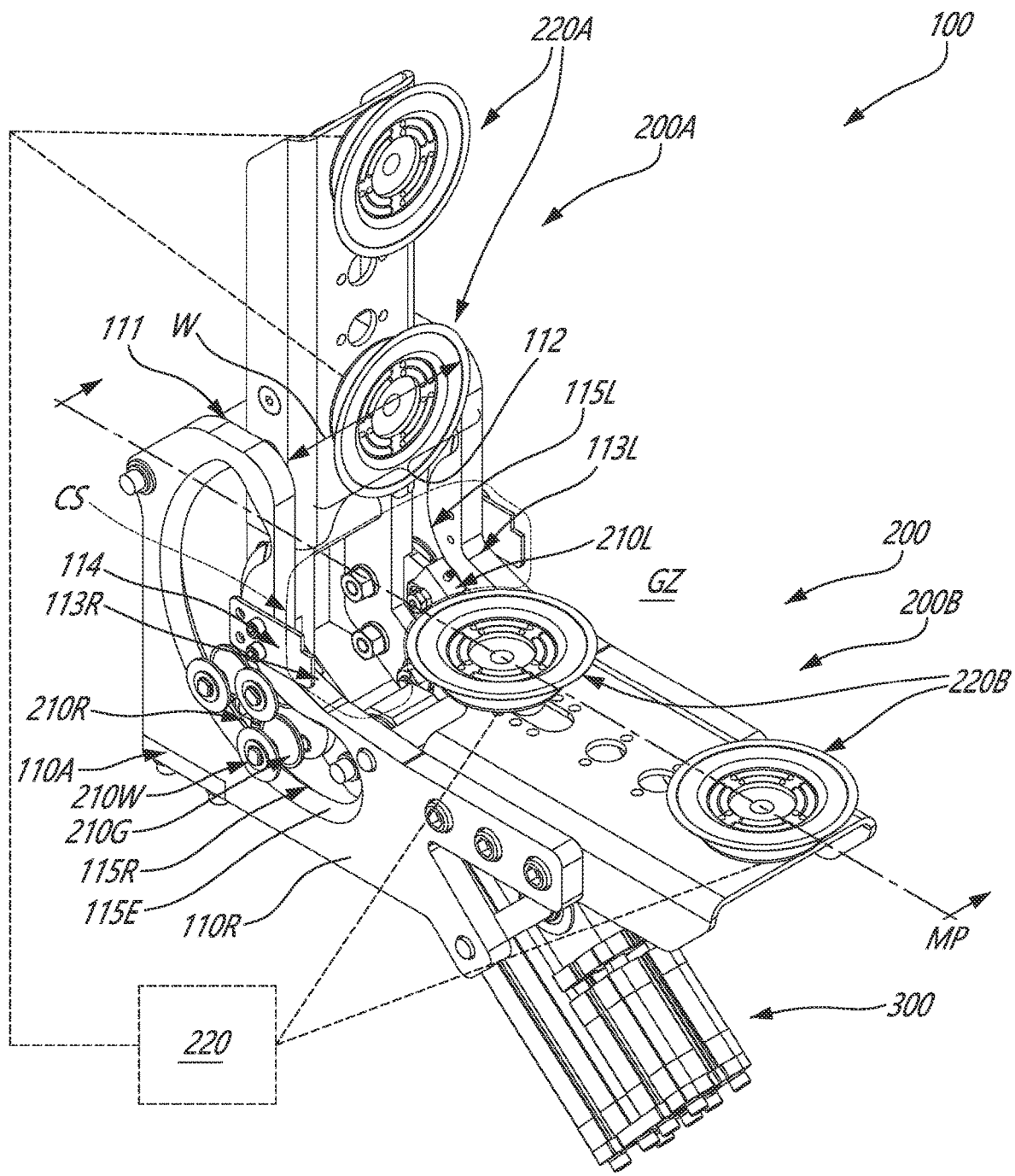
FIG. 2 is another perspective view of the end effector of FIG. 1.

Referring to FIG. 2, the end effector 100 includes a frame 110. In the depicted embodiment, the frame 110 includes a mounting plate 110A defining the attachment portion 100A of the end effector 100. The mounting plate 110A may be different in other embodiments. For instance, the mounting plate 110A may have a shape, bolt pattern, sizes, etc. adapted to fit with a complementary shape, geometry and/or bolt pattern of the connector end 10A different than that shown in FIGS. 1-2. The mounting plate 110A may be integral with the remainder of the frame 110 or a separate part removably secured to the remainder of the frame 110. The end effector 100, including the frame 110 and the gripper assembly 200, may be made of any suitable materials, including, without limitation, aluminium, titanium, plastic or metallic materials, such as steel and stainless steel, composite materials, etc. Aluminium and/or titanium may be more desirable to limit weight of the end effector 100. The frame 110 and/or the gripper assembly 200 may be made via machining, casting, molding, co-molding, or additive manufacturing techniques (e.g. three dimensional printing), for example. The frame 110 (or portions thereof) and/or gripper assembly 200 may be made of different materials (e.g. some portions made of one material while other portions made of one or more other materials), for example.

The frame 110 of the end effector 100 supports the first gripper member 200A, the second gripper member 200B and the actuator arrangement 300. As shown, the first and second gripper members 200A, 200B are mounted to the frame 110. The frame 110 has a left side member 110L and a right side member 110R. In the depicted embodiment, the left and right side members 110L, 110R define respective left and right side plates that are spaced apart from each other on opposite sides of the meridional plane MP. The left and right side members 110L, 110R extend parallel to each other. In the depicted embodiment, a strut (or pin) 111 extends between the left and right side members 110L, 110R of the frame 110. The strut 111 connects to the left and right side members 110L, 110R to further maintain a parallelism between the left and right side members 110L, 110R. Misalignment between the left and right side members 110L, 110R may hinder operation of the end effector 100, as will be further describe later.

The first and second gripper members 200A, 200B are located in a space 112 defined between the left and right side members 110L, 110R. As shown, at least part of the actuator arrangement 300 is located in the space 112. The space 112 has a width W extending between the left and right side members 110L, 110R. It may be desirable to limit the width W between the left and right side members 110L, 110R, for compactness of the end effector 100 and/or to limit its rotational inertia. Such compactness may allow for a more efficient use of the robotic positioner 10 payload (with a greater proportion of the robotic positioner 10 payload dedicated to the object to be handled rather than the rotational inertia of the end effector 100 during pivotal movements). For instance, in at least some embodiments, the width W of the space 112 is between 3 inches and 8 inches. In some other embodiments, it may be even greater (e.g. up to 16 inches). In the depicted embodiment, the width W is 3.978 inches±0.013 inches.

The first and second gripper members 200A, 200B may each be made of a single part or a plurality of parts coupled together. In the depicted embodiment, the second gripper member 200B is fixed relative to the frame 110, here shown as coupled to the left and right side plates forming parts of the frame 110. In the depicted embodiment, the second gripper member 200B may be considered as a part of the frame 110, or as a standalone part. For instance, the left and right side members 110L, 110R, and part of the second gripper member 200B (e.g. plate) may be formed as a monolithic piece. However, in order to facilitate maintenance, disassembling, and/or manufacturing, the parts forming the frame 110 and gripper members may be detachable/fastenable from/to each other.

A gripping zone GZ is defined between the gripper members 200A, 200B. The gripping zone has a variable volume, in that movement of the first gripper member 200A towards the second gripper member 200B reduces (or "closes up") the gripping zone between the first and second gripper members 200A, 200B. The left and right side members 110L, 110R have a generally L-shaped geometry. As shown, the left and right side members 110L, 110R each define a receding corner 113L, 113R. A removable positioning plate(s) 114 (here a pair, though only one could be contemplated) is connected to the left and right side members 110L, 110R. The plate 114 extends forward of the receding corners 113L, 113R, towards the gripping zone GZ. In other words, the plate 114 projects from the receding corners 113L, 113R in a clearance space CS. As shown, the space CS is located between the receding corners 113L, 113R and the gripper items 220A, 220B (described later). The clearance space CS is named as such because, although an object to be gripped can penetrate such space CS, the movable gripper member 200A (and items 220A) moves around the space CS as the gripper member 200A moves toward and away the gripper member 200B, such that the space CS remains free of interference therewith notwithstanding the position of the gripper member 200A relative to the gripper member 200B. The plate 114 will be discussed further later.

Figure 2A:
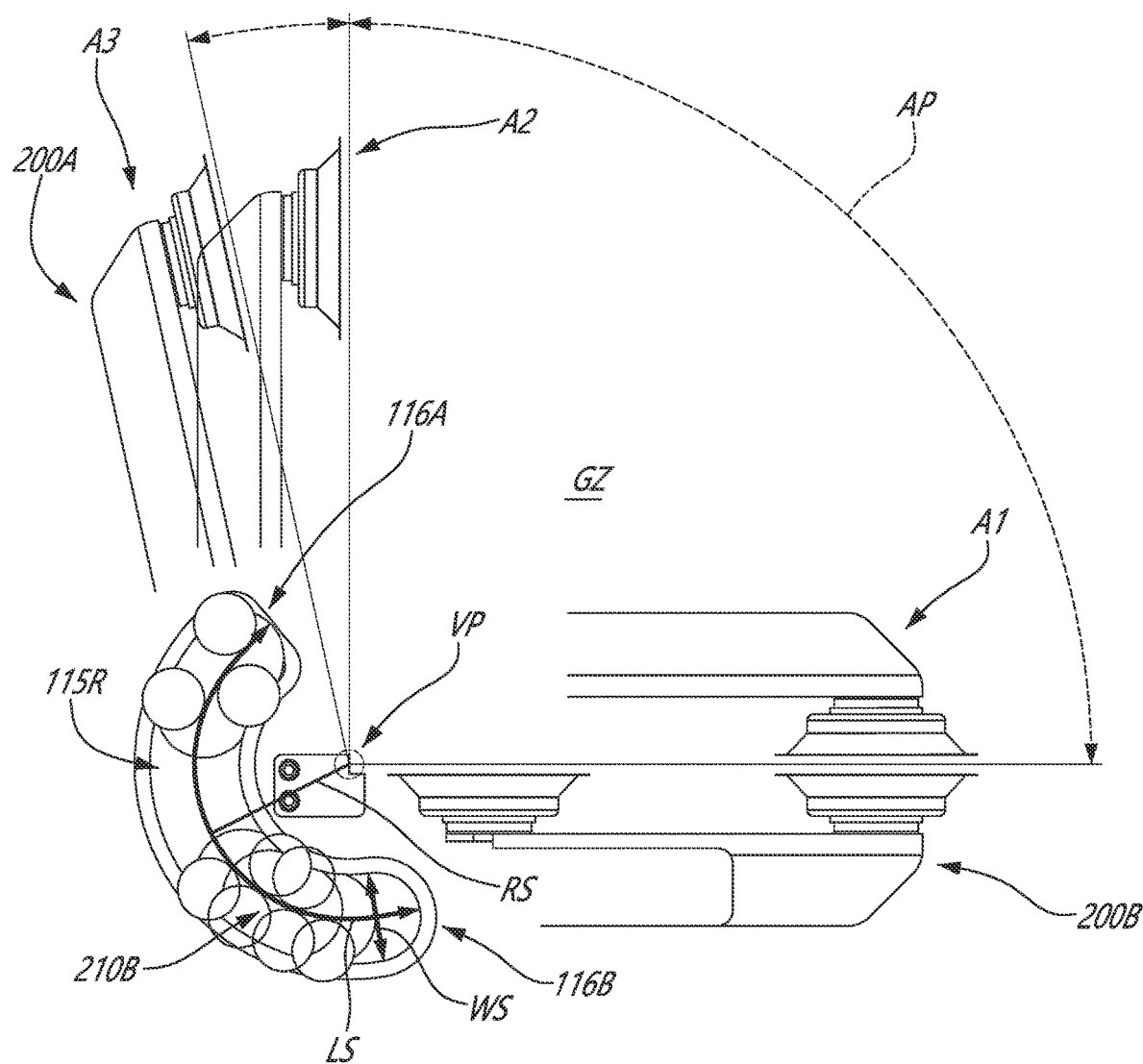
FIG. 2A is a schematic elevation view of the end effector of FIGS. 1-2.

A guiding arrangement allows relative movement between the frame 110 and/or the gripper 200B, and the gripper 200A. The frame 110 defines a guide. The gripper member 200A defines a follower operatively engaged to the guide. Engagement between the follower and the guide constrains the gripper member 200A to movement in at least one rotational movement about a virtual pivot VP. As shown in FIG. 2A, movement of the first gripper member 200A relative to the second gripper member 200B is guided along an arcuate path AP while the first gripper member 200A moves towards and away of the second gripper member 200B. In the depicted embodiment, the follower is defined by a pair of gripper carriers 210L, 210R. The first gripper member 200A is displaceable relative to the left and right side members 110L. 110R via the pair of gripper carriers 210L, 210R. The gripper carriers 210L, 210R are operatively engaged to the guide of the frame 110. As shown, the gripper carriers 210L, 210R are displaceably engaged to the left and right side members 110L, 110R, respectively. In the depicted embodiment, the guide includes guiding slots 115L, 115R defined in the left and right side members 110L, 110R. Parallelism of the left and right side members 110L, 110R may prevent or limit misalignment between the gripper carriers 210L, 210R and the left and right side members 110L, 110R as the gripper carriers 210L, 210R during relative movement.

Referring to FIG. 2A, further aspects of the guiding arrangement will be described. The guiding arrangement will be described with respect to one side of the frame 110, hence the use of singular terms. As shown, the guiding slot 115R is a curved slot having a radius of curvature RS originating from a virtual pivot VP. The guiding slot 115R has a length LS extending from one end 116A to another end 116B of the guiding slot 115R. The guiding slot 115R has a width WS transverse to the length LS. The width WS of the guiding slot 115R may be considered as a segment of the radius of curvature RS, as the width WS is normal to the length LS. In the depicted embodiment, the radius of curvature RS of the guiding slot 115R is constant along the arcuate path AP. In at least some embodiments, the radius of curvature RS of the guiding slot 115R, taken along a center line of the guiding slot 115R, is between 1.5 inches and 4 inches. In a particular embodiment, the radius of curvature RS of the guiding slot is 2.5 inches±0.25 inches. Other radius RS may be contemplated in other embodiments.

The virtual pivot VP is located within the clearance space CS. The virtual pivot VP is spaced away from the gripper members 200A, 200B, the follower, and the guide. As shown, the virtual pivot VP defines an originating point of the arcuate path AP of the first gripper member 200A relative to the second gripper member 200B. In other words, the arcuate path AP and the arc length LS of the guiding slot 115R both originate from the virtual pivot VP. As shown, the arc length LS of the guiding slot 115R and the arcuate path AP are concentric relative to the virtual pivot VP. The virtual pivot VP will be described later in further detail.

Movement of the gripper carrier 210R within the guiding slot 115R is tangent to the radius of curvature RS. As the gripper carrier 210R moves along the length LS, the first gripper member 200A performs a corresponding movement along the arcuate path AP. The gripper carrier 210R is illustrated at three respective positions within the guiding slot 115R, with these three respective positions causing the first gripper member 200A to be in a closed position A1, a first open position A2 defining a 90-degrees angle between the first and second gripper members 200A, 200B, and a second open position A3 defining an angle greater than 90 degrees between the first and second gripper members 200A. 200B. These positions A1, A2 and A3 will be further described later with reference to FIGS. 3A-3D. In the depicted embodiment, the movement of the gripper member 200A is a one-rotational degree of freedom movement. In other embodiments, movement may include a second degree of freedom movement, such as translation. That is, the arcuate path AP may be partially translational in addition to rotational. This may depend on the shape of the guide, for instance.

Returning to FIG. 2, the gripper carriers 210R, 210L each engage the edges 115E of the guiding slots 115L, 115R along the arc length LS. In the depicted embodiment, the gripper carriers 210R, 210L include a plurality of rollers 210W engaging the edges 115E of the guiding slots 115L, 115R. In the depicted embodiment, the plurality of rollers 210W engage one of the edges 115E at respective selected contact points as the gripper carriers 210R, 210L are being carried out within the guiding slots 115L, 115R. In some embodiments, there may be a mechanical play between the rollers 210W of the gripper carriers 210R, 210L and the guiding slots 115L, 115R in the widthwise direction of the guiding slots 115L, 115R. As such, the gripper carriers 210R, 210L, via the rollers 210W, may contact only one of the edges 115E as the gripper carriers 210R, 210L are being carried out within the guiding slots 115L, 115R.

In the depicted embodiment, the edges 115E are chamfered. The gripper carriers 210R, 210L have correspondingly shaped rollers 210W to accommodate the relief/shape of the edges 115E. As shown, the rollers 210W of the gripper carriers 210R, 210L have a circumferential groove 210G for engaging the chamfered edges 115E of the guiding slots 115L, 115R. Alignment of the gripper carriers 210R, 210L in a direction transverse to the meridional plane MP may be maintained while the gripper carriers 210R, 210L move along the guiding slots 115L, 115R. In other words, movements of the gripper carriers 210R, 210L transverse to the length LS and width WS of the guiding slots 115L, 115R may be limited (limited or avoided depending on the fit). Alignment may be controlled differently in other embodiments, as further described later. In other embodiments, the guiding arrangement may include guiding rails instead of the slots, with follower(s) adapted to such guiding rails to allow sliding and/or rolling engagement between them. In yet other cases, the guiding arrangement may include a rack and pinion arrangement to move gripper carriers 210R, 210L or other followers, e.g. a plurality of rollers moving about the virtual pivot VP. The guide and the follower of the guiding arrangement may be interchanged, such that the frame 110 may define the follower instead of the guide, and so on.

In the depicted embodiment, the gripper members 200A, 200B are vacuum grippers. As shown, the gripper members 200A, 200B include suction cups 220A, 220B. The gripper members 200A, 200B include at least one suction cup 220A, 220B. In the depicted embodiment, the gripper members 200A, 200B include a plurality of suction cups 220A, 220B (here two, each). The suction cups 220A, 220B may be of various types. For instance, in an embodiment, the suction cups 220A, 220B are ZPT series vacuum cups, such as the model ZPT80HBN-A16T, as commercialized by SMC Corporation of America. This is given only as an example. At least one vacuum source 220V may be connected to the suction cups 220A, 220B to generate a vacuum with at least some of the suction cups 220A, 220B. The control unit 20 may selectively control the vacuum generated at the suction cups 220A, 220B via the vacuum source 220V. Such control unit 20 may supply instructions or power to one or more motors, actuators, valves, etc., for instance. Electric signals, or fluidic displacement are examples of how instructions and/or power may be supplied by the control unit 20. As another possibility, the gripper members 200A, 200B may be electromagnetic grippers in other embodiments. For instance, the gripper members 200A, 200B may have one or more electromagnetic supports adapted to retain plates/panels (or other objects) having magnetic properties (e.g. plates/panels or other objects made at least in part of iron or other material having magnetic properties). Yet, as another possibility, manipulation of an object may be performed by pressure exerted between the grippers 200A, 200B on such object, without vacuum or electromagnetic force, in other embodiments.

FIGS. 3A-3D illustrates a sequence of positions of the first gripper member 200A relative to the second gripper member 200B along the arcuate path AD.

Referring to FIGS. 3A to 3D, the actuator arrangement 300 is operable to move the first gripper member 200A relative to the second gripper member 200B. The actuator arrangement 300 is connected between the frame 110 and the first gripper member 200A. The actuator arrangement 300 is connected to the frame 110 at a first end 301 via a fixed pivot 301P. The fixed pivot 301P in the embodiment shown is defined by a strut (or pin) 113 extending between the left and right side members 110L, 110R. Such strut 113 may contribute to the maintaining of the parallelism between the left and right side members 110L, 110R, as the strut 111 (FIG. 2). The actuator arrangement 300 is connected to the gripper carriers 210L, 210R at a second end 302 thereby defining a floating pivot 302P. The floating pivot 302P is named as such as it is movable relative to the virtual pivot VP, frame 110 and/or the fixed pivot 301P as the gripper member 200A moves along the arcuate path AP. The second end 302 may be connected to another structure (e.g. another intermediary part between the end 302 and gripper member 200A) in other embodiments, or a part of the gripper member 200A, for instance. The actuator arrangement 300 moves about the virtual pivot VP and/or the clearance space CS as the second gripper member 200B moves toward and away the first gripper member 200A.

In the depicted embodiment, the actuator arrangement 300 includes a first actuator and a second actuator mounted as a pair of linear actuators 303A, 303B, here pneumatic actuators. Pneumatic actuators may allow for a lighter and/or more compact actuator arrangement 300, when compared to hydraulic actuators adapted to provide a similar stroke, for instance. The linear actuator 303A defines the first end 301 of the actuator arrangement 300, and the linear actuator 303B defines the second end 302 of the actuator arrangement 300. The linear actuators 303A, 303B are mounted in parallel, in contrast with in series, with their respective non-pivot ends 304A, 304B coupled together via common back plate 305. While the linear actuators 303A, 303B extend in parallel with respect to each other, they may extend at a relative angle. The term "parallel" as used in this context means that they are not serially mounted. The linear actuators 303A, 303B are independently operable. The linear actuators 303A, 303B are operable to retract and extend between a retracted state and an extended state over their respective strokes. In FIG. 3A, the gripper assembly 200 is in the closed position A1. As shown, the first gripper member 200A is substantially parallel (±2 degrees) to the second gripper member 200B. In the closed position A1, the gripper carrier 210R (210L hidden behind 210R in this view) is located at one end 116A of the guiding slot 115R (i.e. the distalmost end of the guiding slot 115R relative to the fixed pivot 301P). At least in the embodiment shown, in the closed position A1, the linear actuator 303A is in the retracted state while the linear actuator 303B is in the elongated state. Activation of the linear actuator 303B in the extended state may maintain the gripper assembly 200 in the closed position A1. As shown, in this position, the suction cups 220A, 220B of the gripper members 200A, 200B face each other. Depending on the embodiments, the suctions cups 220A, 220B may be axially aligned or offset relative to each other along the gripper members 200A, 200B. As shown in FIG. 3A, a pair of opposing suction cups 220A, 220B located at an end 200E of the respective gripper members 200A, 200B are aligned axially (in a lengthwise direction of the gripper members 200A, 200B) with respect to each other. An another pair of opposing suction cups 220A, 220B closer from the gripper carriers 210L, 210R are axially offset relative to each other. Depending on the embodiments, it may be desirable to have the suctions cups 220A, 220B offset relative to each other to limit (or prevent) them from affixing to each other in the absence of an object between them.

In FIG. 3B, the gripper assembly 200 is shown while transitioning between the closed position A1 to the first open position A2 (or vice versa). As shown, the first gripper member 200A extends at an angle ⊖ smaller than 90 degrees relative to the second gripper member 200B (±45 degrees in FIG. 3B). The linear actuator 303A is in the retracted state while the linear actuator 303B is approximately at midstroke, between the retracted state and the extended state.

In FIG. 3C, the gripper assembly 200 is shown in the first open position A2. As shown, the first gripper member 200A is at a 90 degrees angle ⊖ relative to the second gripper member 200B. As shown, both linear actuators 303A, 303B are in the retracted state. At least in the embodiment shown, activating the linear actuators 303A, 303B both in the retracted allows for maintaining the first and second gripper members 200A. 200B in the first open position A2.

In FIG. 3D, the gripper assembly 200 is shown in the second open position A3. As shown, the first gripper member 200A is at an angle ⊖ greater than 90 degrees relative to the second gripper member 200B. In some embodiments, the relative angle ⊖ between the first and second gripper members 200A, 200B in the second open position is between 90 degrees and 105 degrees. In a particular embodiment, the relative angle ⊖ between the first and second gripper members 200A, 200B in the second open position is 105±2 degrees. Other angles may be contemplated, for instance greater than 105 degrees in the second open position A3. For instance, a second open position A3 could be up to 180 degrees in other embodiments, depending on the actuator arrangement 300 and/or the shape of the guiding assembly (e.g. slots, etc.).

Other actuator arrangement 300 may be contemplated in other embodiments. For instance, an electric linear actuator adapted to stop at a plurality of positions along its stroke may be contemplated, or a rotational actuator part of the follower, such as a motorized roller or carrier, such that the three positions A1, A2 and A3 mentioned above may be obtained by way of a single (or more) electric linear actuator or rotational actuator in other embodiments.

Figure 4:
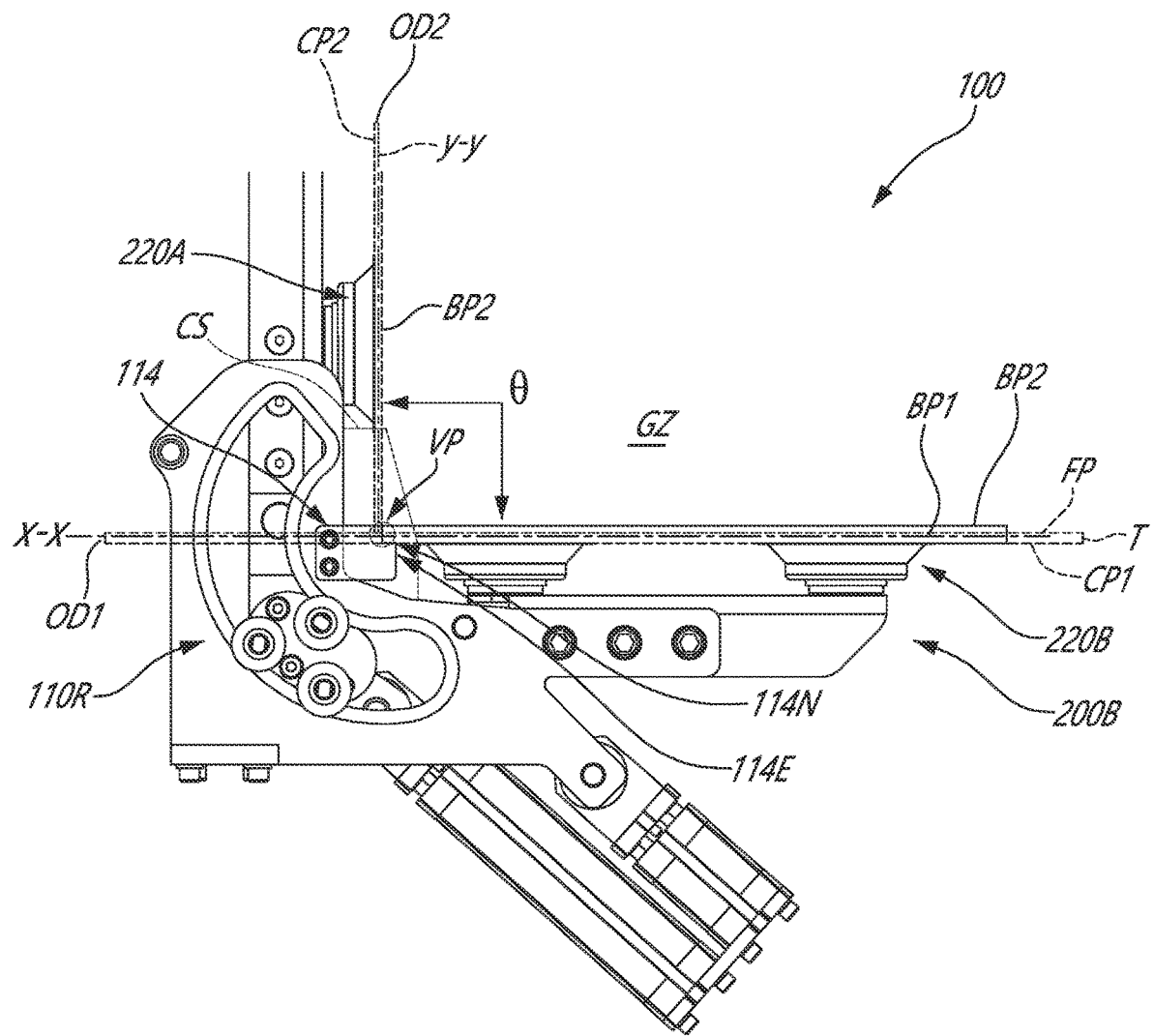
FIG. 4 is another schematic side plane view of the end effector of FIGS. 1-2, shown in the position of FIG. 3C, while holding an object.

FIG. 4 illustrates the end effector 100 having the first and second grippers 200A, 200B in the open position A2. Box panels BP1, BP2 are shown in two super imposed positions, with the panels BP1, BP2 folded on one another, and with the panels BP1, BP2 extending at a 90 degrees angle ⊖ relative to each other. In FIG. 4, the vacuum source 220V (not shown) is activated such that contact planes CP1, CP2 between the respective gripper members 200A, 200B and box panels BP1, BP2 are defined at an interface between the suction cups 220A, 220B and the box panels BP1, BP2 while the suction cups 220A, 220B are in a collapsed (deformed/compressed) state. In FIG. 4, the removable plate 114 is still present to illustrate a relationship with the virtual pivot point VP and the contact planes CP1, CP2. As discussed above, the plate 114 projects into the clearance space CS. The virtual pivot point VP is located in such clearance space CS. In an embodiment, the virtual pivot point VP is located at 1.25 inches±0.5 inches from a closest point of the left and right side members 110L, 110R (as viewed in a side plane such as FIG. 4). This is only an example. A cantilevered end 114E of the plate 114 defines a notch 114N, with the segments of such notch 114N coinciding with an intersecting point of the contact planes CP1, CP2. The notch 114N may serve as a physical and/or visual reference to facilitate the localization of the virtual pivot point VP as an operator is setting the position and movement of the end effector 100 relative to an object entering (or entered in) the gripping zone GZ of the gripper assembly 200. Once the positioning and movement of the end effector 100 has been "taught" (or programmed), the plate 114 may be removed, though it may remain present during operation, if not undesirably cumbersome depending on the intended application.

As the box panels BP1, BP2 are being unfolded, it may be desirable to avoid (avoid or limit) applying shear stress in the box edge (i.e. where the box panels BP1, BP2 intersect/merge). A folding plane FP between the folded box panels BP1, BP2 in a substantially parallel position relative to each other intersects with the virtual pivot VP. As shown, the folding plane FP between the folded box panels BP1, BP2 intersects with an edge of the multi-panel box interconnecting the folded box panels BP1, BP2. Also shown is such edge of the panels BP1, BP2 located within the clearance space CS with the virtual pivot VP. The virtual pivot point VP defines an axis X-X extending orthogonally relative to an axis Y-Y. The axis X-X corresponds to a horizontal axis, and the axis Y-Y corresponds to a vertical axis in the side elevation view of FIG. 4. The axis X-X of the virtual pivot VP is offset along the axis Y-Y relative to the contact plane CP1. With reference to the reference system of FIG. 4, the axis X-X is above the contact plane CP1. In the depicted embodiment, the axis X-X of the virtual pivot VP is offset axially along the axis Y-Y a distance OD1 of about half of a thickness T (±10%) of the box panel BP1 extending along the contact plane CP1. Such offset distance OD1 may account for the compression of the panel when made of a compressible material (e.g. carton) at the box edge at folding, for instance. Also shown, the axis Y-Y of the virtual pivot VP is axially offset along the axis X-X relative to the contact plane CP2. The axis Y-Y of the virtual pivot VP is offset axially along the axis X-X a distance OD2 of about half of a thickness T (±10%) of the box panel BP2 extending along the contact plane CP2. In other embodiments, such offset distances OD1 and/or OD2 may be of about the thickness T (±10%) of the box panel (BP1 and/or BP2), for instance.

Figure 5A:
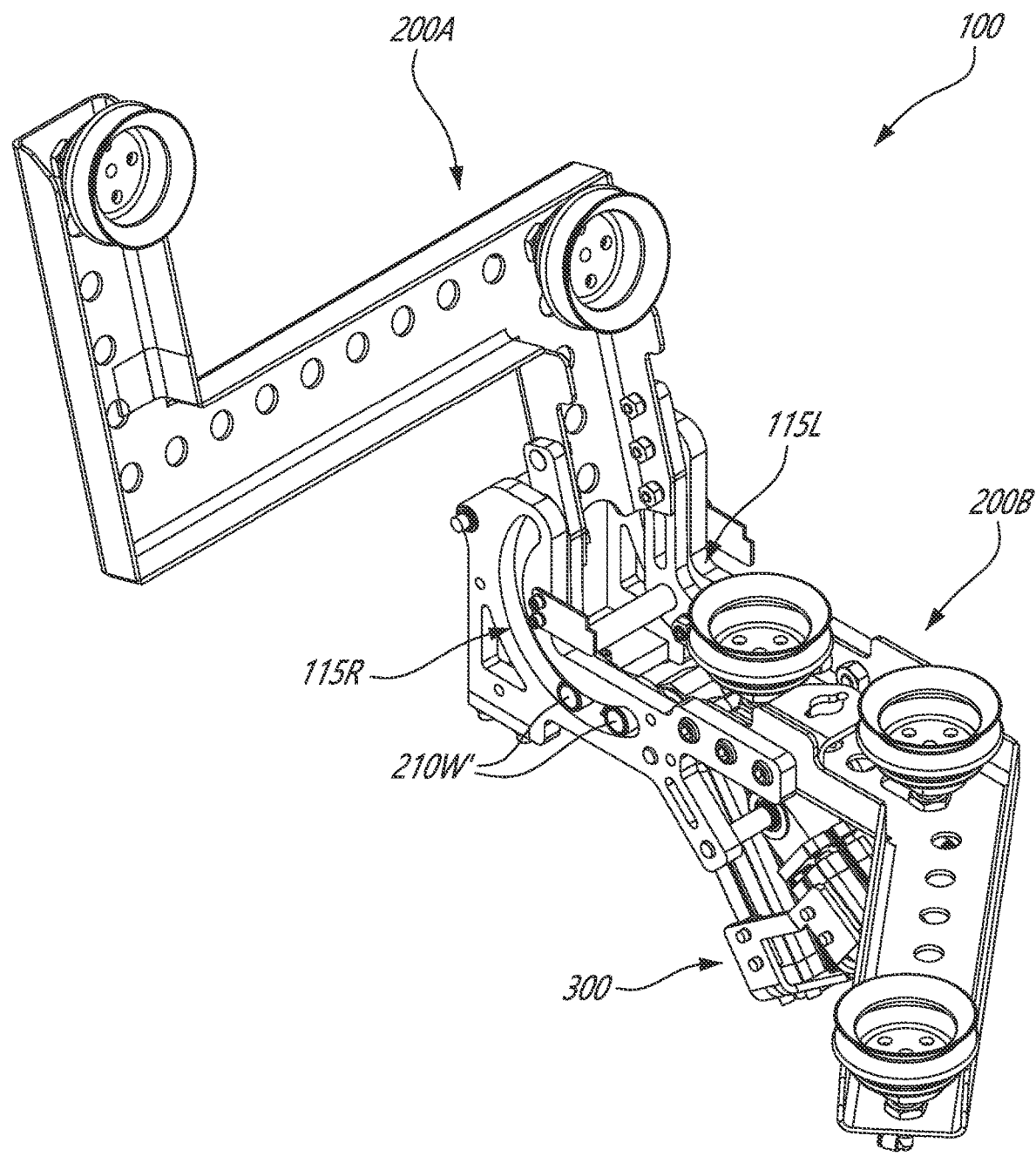
FIG. 5A is a perspective view of an end effector such as shown in FIGS. 1-2, according to another embodiment.

Referring to FIGS. 5A-5G, the end effector 100 will be described according to another embodiment. For conciseness, similar features as those described above with respect to the previous figures will not be described again. Like features have like reference numbers to facilitate understanding. As shown in FIG. 5A, the end effector 100 has a first gripper member 200A and a second gripper member 200B. The gripper member 200A is movable relative to the gripper member 200B via the actuator arrangement 300. In the depicted embodiment, the follower is defined by a plurality of rollers, here a pair of rollers 210W', mounted on opposite sides of the gripper member 200A. The rollers 210W' are in movable engagement with the guide. The rollers 210W' are engaged in the guiding slot 115R. It is to be understood that same applies to the left side of the end effector 100, though not visible in the view of FIG. 5A. A mechanical play between the rollers 210W' and the guiding slot 115R may be present to reduce friction between the rollers 210W' and the guiding slot 115R during movement. As shown in FIG. 5B, spacers 210S are located at each one of the rollers 210W' for interfacing between the gripper member 200A and the left and right side members 110L, 110R. Such spacers 210S may slide (or at least reduce friction) between the left and right side members 110L, 110R and the gripper member 200A.

FIG. 5C-5F show respective positions of the gripper assembly 200, corresponding to that shown in FIGS. 3A-3D. For conciseness, only the distinctions with respect to the actuator arrangement 300 will be described, though it should be understood that general functionality is similar to that already described. As shown, the linear actuators of the arrangement 300 extend at angle relative to each other. As shown, the first linear actuator and the second linear actuator define a relative angle β of 20±5 degrees. Such angle β remains fixed as the actuator arrangement 300 pivots during the guided movement of the rollers 210W' along the slot 115. In the closed position A1 (FIG. 5C), the linear actuator 303B is extended while the other linear actuator 303A is retracted. Angle α1 between the longitudinal axis L2 of the linear actuator 303B and a central line CC passing by the centers of the rollers 210W' is 57.14±0.25 degrees. In the position of FIG. 5D, the linear actuator 303B is semi-extended while the linear actuator 303A is retracted. In the first open position A2, both linear actuators 303A, 303B are retracted. Angle α2 between the longitudinal axis L2 of the linear actuator 303B and the central line CC passing by the centers of the rollers 210W' is 30.21±0.25 degrees. In the second open position A3, the linear actuator 303B is retracted while the other linear actuator 303A is extended. Angle α3 between the longitudinal axis L1 of the linear actuator 303A and the central line CC passing by the centers of the rollers 210W' is 26.93±0.25 degrees. In at least some embodiments, it may be desirable to minimize the angles α1, α2 and α3 to limit radial loads on the actuator rod and/or facilitate movement of the rollers 210W' along the slot 115. Angles α1, α2, α3 and β may be different in other embodiments. For instance they may all vary ±15 degrees.

Figure 5G:
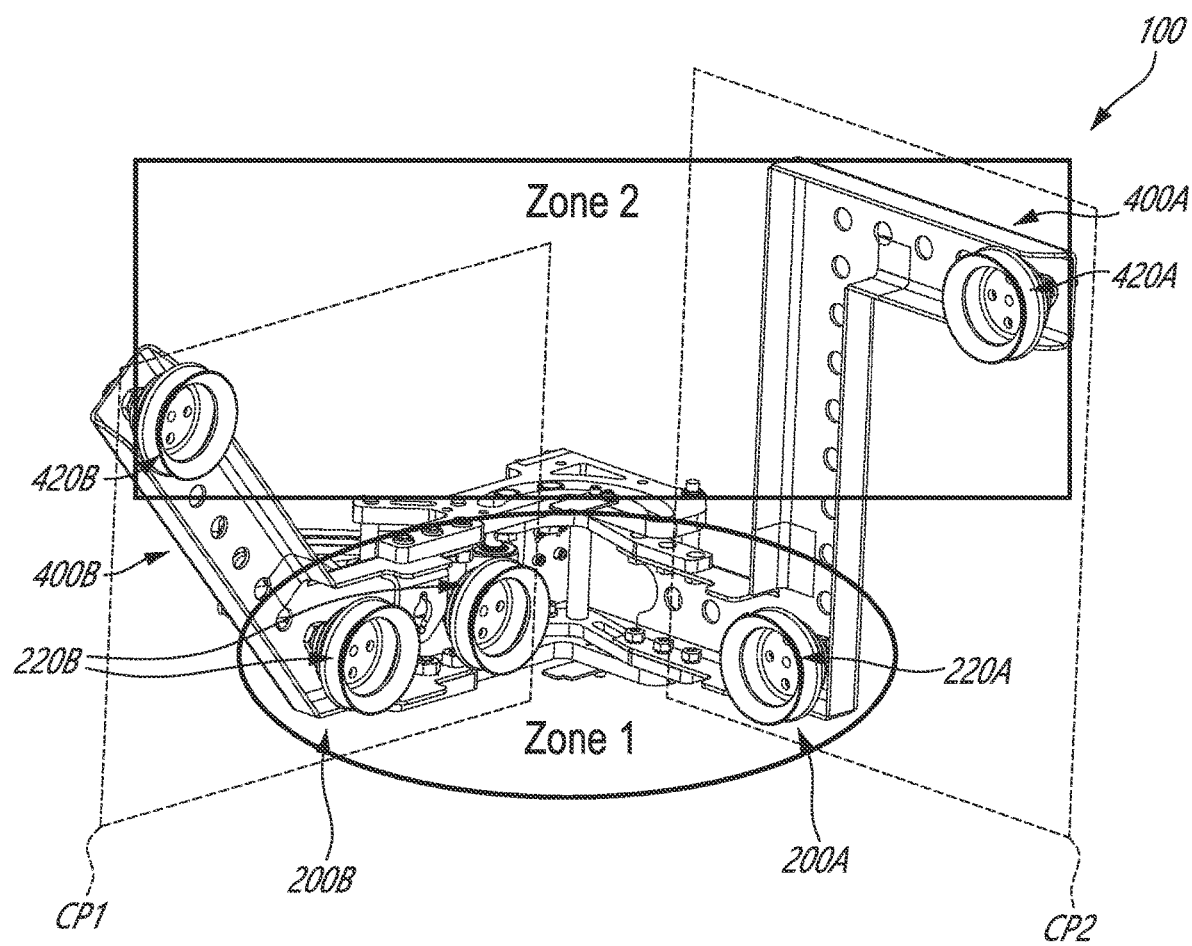
FIG. 5G is another perspective view of the end effector of FIGS. 5A-5F.

Referring to FIG. 5G, the first and second gripper members 200A, 200B define a first gripping zone (Zone 1) of the end effector 100. A first extension arm 400A extends from the first gripper member 200A and a second extension arm 400B extends from the second gripper 200B. In the depicted embodiment, the extension arms 400A, 400B form a monolithic piece with their respective first and second gripper members 200A, 200B, though they can be separate parts attached to each other. As shown, the extension arms 400A, 400B include suction cups 420A, 420B corresponding to that of the first and second gripper members 200A, 200B. The extension arms 400A, 400B define a second gripping zone (Zone 2). The suction cups 420A, 420B in such second gripping zone may be activated independently from the suction cups 220A, 220B of the first gripping zone, The extension arms 400A, 400B may provide additional support of the box panels (or other object having a large span and/or volume) when manipulated. Such additional support may limit even more bulking and/or other panel deformation when manipulated by the end effector 100, depending on the size/dimensions of the box/object to be formed/handled. As shown, the suction cups 420A, 420B of the extension arms 400A, 400B form part of the contact planes CP1, CP2 (discussed above), although offset (offset or at a distance) from the meridional plane MP.

The extension arms 400A, 400B and related components and configuration of the guiding arrangement described in connection with the embodiment shown in FIGS. 5A-5F, may apply to any other embodiments described herein.

FIG. 6A, illustrates a variant of the end effector 100. Like features are not described again for conciseness. The attachment portion 100A of the end effector 100 is oriented such that the rotation axis R1-R1 of the connector end 10A of the robotic positioner 10 (FIG. 6B) intersects with a center of gravity CG of the end effector 100. As shown in FIG. 6A, the frame 110 of the end effector 100 includes a mounting plate 110A defining the attachment portion 100A of the end effector 100. The rotation axis R1-R1 intersect with the mounting plate 110A. In the depicted embodiment, the rotation axis R1-R1 is transverse to the mounting plate 110A. The mounting plate 110A has a surface 110B, which may be referred to as a mounting surface of the frame 110, for engaging the connector end 10A of the robotic positioner 10. The surface 110B has a normal vector 110C coaxial with the rotation axis R1-R1. The normal vector 110C of the mounting plate 110A extends in the meridional plane MP of the end effector 100. The projection of the normal vector 110C intersects with the center of gravity CG of the end effector 100.

Aligning the rotation axis R1-R1 with the center of gravity CG of the end effector 100 may minimize the inertia of the end effector 100. This may limit the impact of the end effector 100, for instance due to its weight and/or weight distribution, on the nominal payload of the robotic positioner 10. A lesser inertia of the end effector 100 about the rotational axis R1-R1 of the connector end 10A may reduce the loss of robotic positioner payload associated with the end effector 100. Operating the robotic positioner 10 equipped with the end effector 100 having the center of gravity CG aligned with the rotation axis R1-R1 of the connector end 10A may provide a greater proportion of the nominal payload of the robotic positioner 10 to the object being manipulated, formed and/or transported.

The gripper assembly 200 of any one of the various embodiments discussed above may be configured such that both gripper members 200A, 200B may be movable relative to the frame 110 in other embodiments. For instance, in an embodiment, both gripper members 200A, 200B may define followers that are operatively engage to guide(s) of the frame 110 as discussed above, and coupled to one or more actuators.

Referring to FIGS. 7A to 7F, the end effector 100 according to the present disclosure will be described in operation for one possible practical application.

As shown, the end effector 100 is mounted to the connector end 10A of the robotic positioner 10. The robotic positioner 10 has a base 10C, which may be fixed or movable (e.g. via a rail assembly, a wheel assembly, etc.) relative to the ground depending on the embodiments. A carton magazine 500 is disposed in the vicinity of the robotic positioner 10, at a distance that is reachable by the connector end 10A. A carton pile 501 may be stacked in/on the carton magazine 500, where the robotic positioner 10 will grab one carton from the pile 501 with the end effector 100. A carton drop zone 600 is also defined in the vicinity of the robotic positioner 10. A carton closing station 601 may be part of the drop zone 600. By further motions of the robotic positioner 10 holding the unfolded carton within the drop zone 600, the robotic positioner 10 may cooperate with features of the carton closing station 601. In the carton closing station 601, panels forming the bottom of the carton may be folded and secured together to complete the carton forming steps as the carton remains held by the end effector 100. After such carton closing step, the vacuum source (not shown) may be deactivated to release the carton from the end effector 100.

Figure 7A:
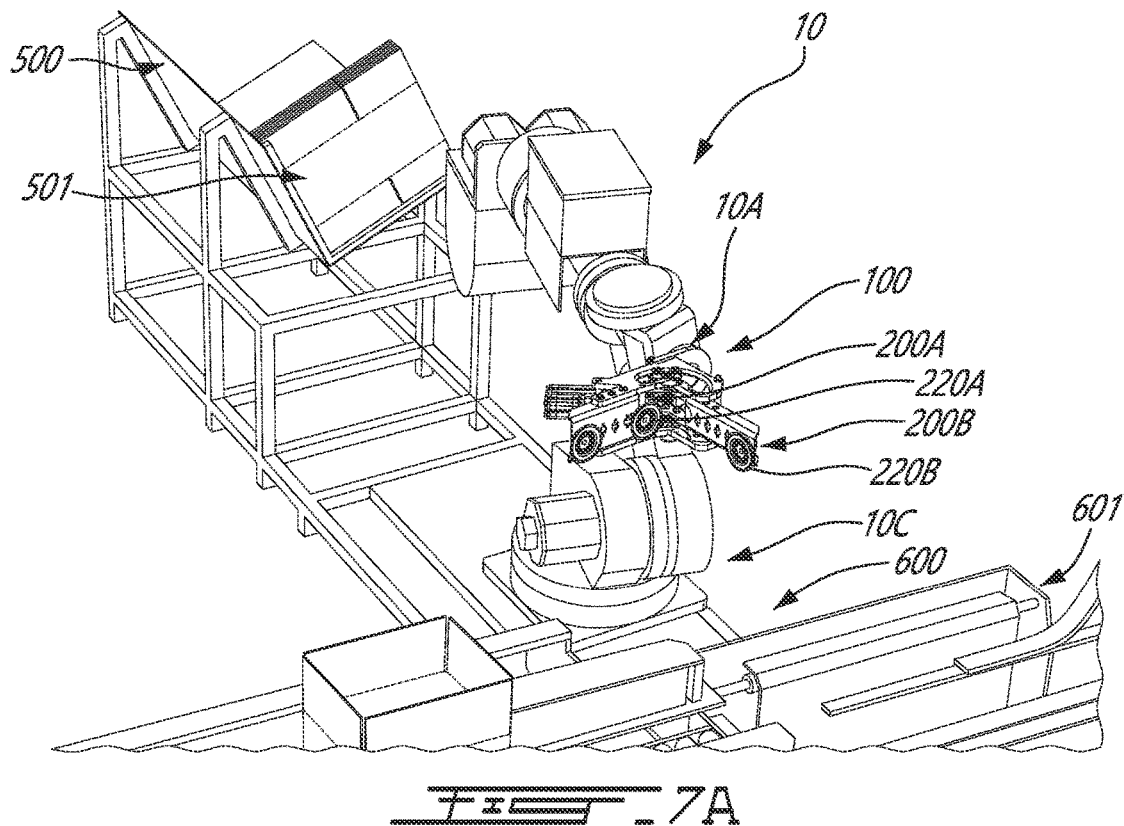

In FIG. 7A, the robotic positioner 10 and the end effector 100 are in motion towards the carton pile 501. The end effector 100 is in the open position A2. The end effector 100 could be in any other positions (e.g. one of that shown in FIGS. 3A-3D) as the robotic positioner 10 moves the end effector 100 towards the carton pile 501. At an instant before reaching out to the carton pile 501, the end effector 100 is positioned in the open position. In at least some embodiments, the end effector 100 may be positioned in the second open position A3 to increase the volume of the gripping zone GZ between the gripper members 200A, 200B of the end effector 100 while part of the carton magazine 500 is located within such gripping zone GZ. Having a greater gripping zone GZ may facilitate the positioning of the end effector 100 close to the carton pile 501, and align the folded edge of the carton to be grabbed relative to the virtual pivot VP as described above.

Once the end effector 100 is positioned relative to the folded carton to be grabbed, with the folded edge of the carton positioned relative to the virtual pivot VP so as to have the folded edge in the clearance space CS with the virtual pivot VP (discussed above), the vacuum of the vacuum cups 220B of the gripper member 200B are activated such that the vacuum cups 220B may adhere to the panel of the carton facing therewith.

Figure 7B:
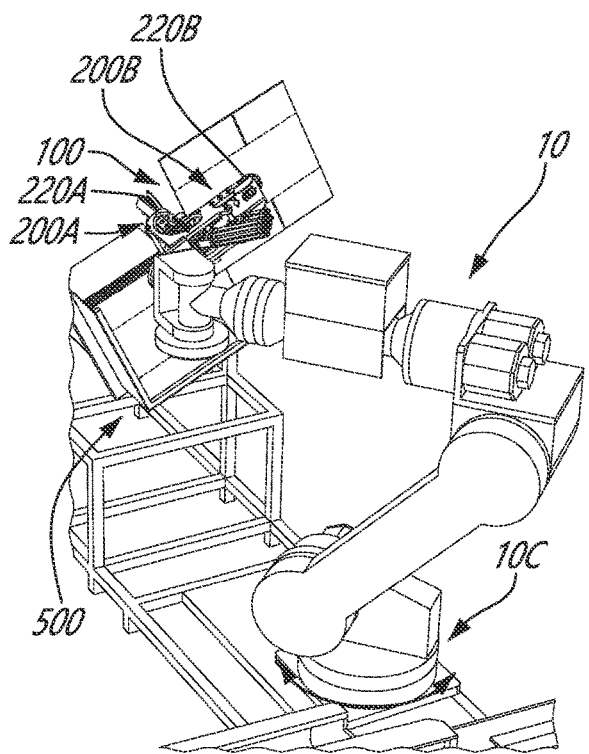
Figure 7C:
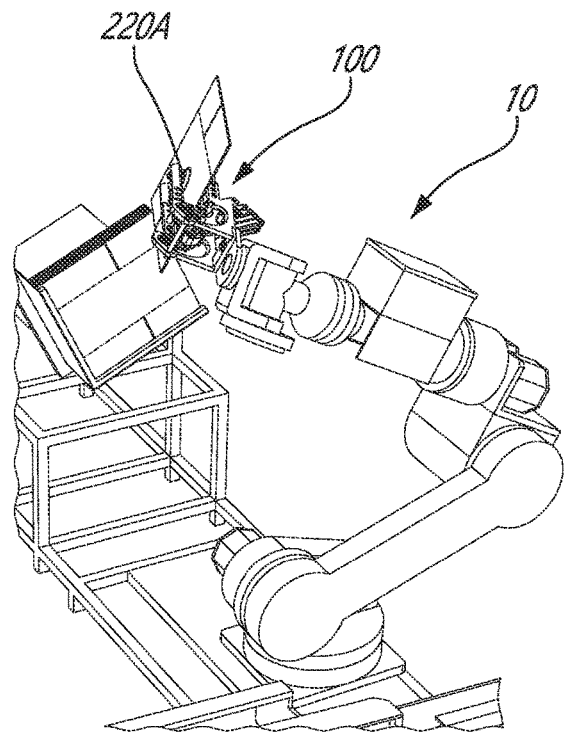

In FIG. 7B, the robotic positioner 10 is shown at an instant after the vacuum cups 220B has adhered to the panel of the carton facing therewith, with the end effector 100 still in the second open position A3. In FIG. 7B, the robotic positioner 10 performs a rotational movement relative to its base as it is taking the carton away from the carton magazine 500. At any time after the end effector 100 holding the carton has cleared any surrounding obstacles, the second gripper member 200B may be displaced in the closed position (FIG. 3A). The vacuum cups 220A of the gripper member 200A may then be activated to adhere (secure) the vacuum cups 220A of the gripper member 200A onto another panel of the carton hingedly connected to the panel of the carton adhered to the vacuum cups 220B of the gripper member 200B. This is shown in FIG. 7C.

In FIGS. 7D-7E, as the end effector 100 travels towards the carton drop zone 600, the end effector 100 may transition from the closed position A1 (FIG. 7D) to the open position A2 (FIG. 7E), such that the panels fixed (secured) to the respective gripper members 200A, 200B may be moved away from each other by following the angular path AP of the gripper member 200A relative to the gripper member 200B. The first and second panels move angularly relative to each other about the virtual pivot VP. In the position shown in FIG. 7E, the panels adhered (secured) to the respective gripper members 200A, 200B are at a relative angle ⊖ of 90 degrees (±0.25 degrees). Depending on the box shape, number of sides, etc., the angle defined between the side panels in the open position A2 may be different than 90 degrees. For instance, in an embodiment, the gripper assembly 200 may form an angle ⊖ smaller than 90±0.25 degrees for a non-rectangular box (e.g. triangular box, parallelogram box, etc.). As such, angles between the first and second gripper members 200A, 200B in the open position A2 may vary depending on the application and/or embodiments of the end effector 100.

In FIG. 7F, the suction cups 220A, 220B of the respective gripper members 200A, 200B are deactivated to release the carton from the end effector 100. The end effector 100 may remain in the open position A2, or transitions to the open position A3 as the end effector 100 travels towards the carton magazine 500 to repeat the operations. The robotic positioner 10 may impart to the end effector 100 a number of rotational motions and/or translational motions to position the end effector 100 in the right orientation for the end effector 100 to be ready to grab another carton. Such pre-positioning of the end effector 100 in the space may be performed during the travel time between the dropping of the unfolded carton to the grabbing of another folded carton from the carton magazine 500.

Based on that described above, a method of operating an end effector for forming a multi-panel box having panels hingedly connected one to another may include the following non-limiting steps: positioning a gripping zone GZ of the end effector 100 relative to the multi-panel box in a folded configuration so as to locate a first one of the panels BP1, BP2 and a second one of the panels BP1, BP2 hingedly connected to the first one of the panels in the gripping zone GZ; securing a first one of the gripper member 200A, 200B to the first one of the panels BP1, BP2; varying a volume of the gripping zone GZ by moving to a closed position A1 the first one of the gripper member 200A, 200B towards a second one of the gripper member 200A, 200B about a virtual pivot VP located in a clearance space CS between the gripping zone GZ and a frame 110 of the end effector 100, along an arcuate path AP; securing the second one of the gripper member 200A, 200B to the second one of the panels BP1, BP2; and unfolding the first one of the panels BP1, BP2 relative to the second one of the panels BP1, BP2 by moving the first one of the gripper member 200A, 200B along the arcuate path AP away from the second one of the gripper member 200A, 200B, from the closed position A1 to a first open position A2. In at least some embodiments, the positioning of the gripping zone GZ may include positioning the end effector 100 so as to have an edge interconnecting the first one of the panels BP1, BP2 and the second one of the panels BP1, BP2 extending in the clearance space CS with the virtual pivot VP, a folding plane FP of the first one of the panels BP1, BP2 and the second one of the panels BP1, BP2 intersecting with the virtual pivot VP.

Other aspects of the method of operation may be contemplated in accordance with that described above with respect to various embodiments of the end effector 100 and the practical application described above with respect to FIGS. 7A to 7F. It is to be understood that the various embodiments of the end effector 100 described above may apply to the practical application described above and exemplified at FIGS. 7A to 7F.

With reference to FIG. 8, the operation of the robotic positioner 10 and end effector 100 as discussed herein, including in accordance with one possible application shown in FIGS. 7A-7F, may be implemented by a computing device 710, as an embodiment of the control unit 20. The computing device 710 comprises a processing unit 712 and a memory 714 which has stored therein computer-executable instructions 716. The processing unit 712 may comprise any suitable devices configured to implement the functionality of the control unit 20 such that instructions 716, when executed by the computing device 710 or other programmable apparatus, may cause the functions/acts/steps performed by the control unit 20 as part of the operation of the robotic positioner 10 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712.

The methods and systems described herein may be implemented in a high level procedural or object oriented programming or scripting language, or a combination thereof, to communicate with or assist in the operation of a computer system, for example the computing device 710. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 712 of the computing device 710, to operate in a specific and pre-defined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, although described herein as a carton forming end effector, the end effector 100 may be operable to achieve other tasks. For instance, the end effector 100 may be operable to displace various objects, such as, without limitations, panels, foldable objects (e.g. foldable containers), having hingedly connected panels, where such panels may be moved to change a shape of the foldable object.

Yet further modifications could be implemented by a person of ordinary skill in the art in view of the present disclosure, which modifications would be within the scope of the present technology.

The invention claimed is:

1. An end effector for forming a multi-panel box having panels hingedly connected one to another, the end effector comprising:
    a frame defining a guide;
    a first gripper member connected the frame, the first gripper member adapted to connect to a first one of the panels of the multi-panel box;
    a second gripper member adapted to connect to a second one of the panels of the multi-panel box hingedly connected to the first one of the panels at an edge of the multi-panel box, the second gripper member defining a follower operatively engaged to the guide, an engagement between the follower and the guide constraining the second gripper member to movement in at least one rotational movement about a virtual pivot spaced away from the first gripper member, the second gripper member, the follower and the guide, wherein the first gripper member and the second gripper members include at least one suction cup operable to generate a vacuum on the first and second ones of the panels of the multi-panel box; and
    at least one actuator connected to the second gripper member for moving the second gripper member toward and away from the first gripper member in the at least one rotational movement, the at least one actuator is operable to move the second gripper member relative to the first gripper member between a closed position and at least a first open position, a gripping zone defined between the first and second gripper members, the gripping zone having a variable volume in that movement of the second gripper member towards the first gripper member from the first open position to the closed position closes up the gripping zone between the first and second gripper members.

2. The end effector as defined in claim 1, wherein a clearance space is defined between the frame and the gripping zone, the clearance space being free of interference with the first gripper member and the second gripper member between the closed position and the first open position, the clearance space receiving the edge of the multi-panel box when the first gripper member and the second gripper member are connected to the first and second ones of the panels, the virtual pivot located in the clearance space.

3. The end effector as defined in claim 1, wherein the first gripper member and the second gripper member are substantially parallel in the closed position.

4. The end effector as defined in claim 1, wherein the first gripper member and the second gripper member defines an angle of 90 degrees±2 degrees therebetween in the first open position.

5. The end effector as defined in claim 1, wherein the second gripper member is movable relative to the first gripper member from the closed position to a second open position, the angle between the first gripper member and the second gripper member greater than 90 degrees in the second open position.

6. The end effector as defined in claim 5, wherein the angle between the first gripper member and the second gripper member in the second open position is between 90 degrees and 105 degrees±2 degrees.

7. The end effector as defined in claim 1, wherein the guide includes a curved slot having a radius of curvature originating from the virtual pivot, the second gripper member follows an arcuate path about the virtual pivot between the closed position and the first open position, the radius of curvature of the curved slot is constant along the arcuate path.

8. The end effector as defined in claim 1, wherein the follower includes a plurality of rollers in movable engagement with the guide, the plurality of rollers mounted on at least one of the second gripper member and a gripper carrier member mounted on the second gripper member.

9. The end effector as defined in claim 1, wherein the at least one actuator is part of an actuator arrangement connected between the frame and the second gripper member, the actuator arrangement connected to the frame at a first end via a fixed pivot and at the second gripper member at a second end via a floating pivot, the floating pivot movable relative to the virtual pivot as the second gripper member moves toward and away from the first gripper member.

10. The end effector as defined in claim 9, wherein the at least one actuator of the actuator arrangement includes a first linear actuator and a second linear actuator, the first linear actuator defines the first end of the actuator arrangement and the second linear actuator defines the second end of the actuator arrangement.

11. The end effector as defined in claim 10, wherein the first linear actuator and the second linear actuator are mounted in parallel, the first linear actuator and the second linear actuator each having a non-pivot end coupled together.

12. An end effector for a robotic positioner, the end effector comprising:
a frame adapted to connect to the robotic positioner;
a first gripper member extending from the frame;
a second gripper member angularly displaceable relative to the first gripper member about a virtual pivot, along an arcuate path; and
an actuator arrangement operable to move the second gripper member relative to the first gripper member, the actuator arrangement moving about the virtual pivot as the second gripper member moves relative to the first gripper member, wherein the actuator arrangement is connected to the frame via a fixed pivot and to the second gripper member via a floating pivot, the floating pivot movable relative to the virtual pivot as the second gripper member is displaced angularly relative to the first gripper member, and wherein the actuator arrangement includes a first linear actuator and a second linear actuator, the first linear actuator connected to the fixed pivot and the second linear actuator connected to the floating pivot.

13. The end effector as defined in claim 12, wherein the first linear actuator and the second linear actuator are mounted in parallel, the first linear actuator and the second linear actuator each having a non-pivot end coupled together.

14. The end effector as defined in claim 13, wherein the first linear actuator and the second linear actuator extend at angle relative to each other the angle between the first linear actuator and the second linear actuator remaining fixed as the actuator arrangement moves about the virtual pivot.

15. The end effector as defined in claim 12, wherein the second gripper member is guided along the arcuate path by a guide and a follower operatively engaged to the guide, the frame defining one of the guide and the follower and the second gripper member defining the other one of the guide and the follower, an engagement between the follower and the guide constraining the second gripper member to movement in at least one rotational movement about the virtual pivot, the second gripper member angularly displaceable relative to the first gripper member between a closed position and at least a first open position, a gripping zone defined between the first and second gripper members, the gripping zone having a variable volume in that movement of the second gripper member towards the first gripper member from the first open position to the closed position closes up the gripping zone between the first and second gripper members, a clearance space defined between the frame and the gripping zone, the virtual pivot located in the clearance space, the clearance space being free of interference with the first gripper member. the second gripper member and the actuator arrangement between the closed position and the first open position.

16. The end effector as defined in claim 15, wherein the guide includes a curved slot defined by the frame, the curved slot having a radius of curvature originating from the virtual pivot.

17. The end effector as defined in claim 16, wherein the follower includes a plurality of rollers in movable engagement with the curved slot.

18. An end effector for forming a multi-panel box having panels hingedly connected one to another, the end effector comprising:
a frame defining a guide;
a first gripper member connected the frame, the first gripper member adapted to connect to a first one of the panels of the multi-panel box;
a second gripper member adapted to connect to a second one of the panels of the multi-panel box hingedly connected to the first one of the panels at an edge of the multi-panel box, the second gripper member defining a follower operatively engaged to the guide, an engagement between the follower and the guide constraining the second gripper member to movement in at least one rotational movement about a virtual pivot spaced away from the first gripper member, the second gripper member, the follower and the guide;
at least one actuator connected to the second gripper member for moving the second gripper member toward and away from the first gripper member in the at least one rotational movement, the at least one actuator is operable to move the second gripper member relative to the first gripper member between a closed position and at least a first open position, a gripping zone defined between the first and second gripper members, the gripping zone having a variable volume in that movement of the second gripper member towards the first gripper member from the first open position to the closed position closes up the gripping zone between the first and second gripper members; and
wherein the first gripper member and the second gripper member defines an angle of 90 degrees±2 degrees therebetween in the first open position.

19. The end effector as defined in claim 18, wherein the second gripper member is movable relative to the first gripper member from the closed position to a second open position, the angle between the first gripper member and the second gripper member greater than 90 degrees in the second open position.

20. The end effector as defined in claim 18, wherein a clearance space is defined between the frame and the gripping zone, the clearance space being free of interference with the first gripper member and the second gripper member between the closed position and the first open position, the clearance space receiving the edge of the multi-panel box when the first gripper member and the second gripper member are connected to the first and second ones of the panels, the virtual pivot located in the clearance space.

\* \* \* \* \*